(12) United States Patent
Dorendorf et al.

(10) Patent No.: US 9,506,665 B2
(45) Date of Patent: Nov. 29, 2016

(54) REMOTE CONTROL SYSTEM FOR CONTROLLING OPERATION OF A FAN ASSEMBLY

(71) Applicant: Direct Success, LLC, Cape Coral, FL (US)

(72) Inventors: Bruce Dorendorf, Cape Coral, FL (US); Greg Parkhurst, Brooklyn Park, MN (US)

( * ) Notice: Subject to any disclaimer, the term of this patent is extended or adjusted under 35 U.S.C. 154(b) by 351 days.

(21) Appl. No.: 14/162,172

(22) Filed: Jan. 23, 2014

(65) Prior Publication Data

US 2014/0131459 A1    May 15, 2014

Related U.S. Application Data

(63) Continuation-in-part of application No. 12/787,867, filed on May 26, 2010, now Pat. No. 8,640,970.

(60) Provisional application No. 61/181,396, filed on May 27, 2009.

(51) Int. Cl.
*F24F 11/02*   (2006.01)
*F24F 11/00*   (2006.01)
*F24F 7/00*    (2006.01)

(52) U.S. Cl.
CPC ........ *F24F 11/0001* (2013.01); *F24F 11/0079* (2013.01); *F24F 2007/001* (2013.01); *F24F 2011/0038* (2013.01); *F24F 2011/0068* (2013.01); *Y02B 30/746* (2013.01)

(58) Field of Classification Search
CPC ............. F24F 11/0001; F24F 11/0079; F24F 2007/001; F24F 2007/0038; F24F 2011/0068; Y02B 30/746
See application file for complete search history.

(56) References Cited

U.S. PATENT DOCUMENTS

| | | | | |
|---|---|---|---|---|
| 8,964,708 | B2 * | 2/2015 | Petite | G01V 1/364 340/870.02 |
| 2005/0273917 | A1 * | 12/2005 | Lapossy | E03D 9/05 4/213 |
| 2010/0105311 | A1 * | 4/2010 | Meneely, Jr. | F24F 11/0017 454/239 |
| 2010/0188251 | A1 * | 7/2010 | Panuce | G08C 17/02 340/12.22 |

* cited by examiner

*Primary Examiner* — Marc Norman
(74) *Attorney, Agent, or Firm* — Buckert Patent & Trademark Law Firm, PC; John F. Buckert

(57) ABSTRACT

A remote control system for controlling operation of a fan assembly is provided. The system includes a first sensor module having a first housing, a first sensor, a first microprocessor, and a first RF transmitter. The first microprocessor is programmed to generate a first control signal to induce the first RF transmitter to transmit a first RF signal in response to a sensor signal from the first sensor. The first RF signal has a first address value and a first command value. The remote control system further includes a fan control module having a second housing, a second microprocessor, an AC power plug, an AC/DC voltage converter, a controllable switch, and an RF receiver. The RF receiver is configured to receive the first RF signal.

17 Claims, 26 Drawing Sheets

REMOTE CONTROL SYSTEM FOR CONTROLLING OPERATION OF A FAN ASSEMBLY

CROSS-REFERENCE TO RELATED APPLICATIONS

The present application is a continuation-in-part of U.S. patent application Ser. No. 12/787,867 filed on May 26, 2010, the contents of which are incorporated herein by reference thereto in its entirety. U.S. patent application Ser. No. 12/787,867 claims the benefit of U.S. Provisional Patent Application Ser. No. 61/181,396, filed on May 27, 2009, the contents of which are incorporated herein by reference thereto in its entirety.

BACKGROUND

A bathroom fan is typically controlled utilizing a wall switch. However, when a person does not initially turn on the bathroom fan when they start bathing or showering, a significant amount of humidity may be undesirably present in the bathroom. Further, when a person does not initially turn on the bathroom fan and they utilize a toilet in the bathroom, a significant amount of odor may undesirably be present in the bathroom.

Accordingly, the inventors herein have recognized a need for an improved remote control system for controlling a fan assembly that reduces and/or minimizes the above-mentioned deficiencies.

SUMMARY

A remote control system for controlling operation of a fan assembly in accordance with an exemplary embodiment is provided. The remote control system includes a first sensor module having a first housing, a first sensor, a first microprocessor, and a first RF transmitter. The first sensor, the first microprocessor and the first RF transmitter are disposed within the first housing. The first microprocessor is operably coupled to the first sensor and the first RF transmitter. The first microprocessor is programmed to generate a first control signal to induce the first RF transmitter to transmit a first RF signal in response to a sensor signal from the first sensor. The first RF signal has a first address value and a first command value. The remote control system further includes a fan control module having a second housing, a second microprocessor, an AC power plug, an AC/DC voltage converter, a controllable switch, and an RF receiver. The second microprocessor, the AC/DC voltage converter, the controllable switch, and the RF receiver are disposed within the second housing. The AC power plug is coupled to the second housing. The second microprocessor is operably coupled to the AC/DC voltage converter, the controllable switch, and the RF receiver. The AC power plug is electrically coupled to the AC/DC voltage converter and to the controllable switch such that an AC voltage is routed from the AC power plug to the AC/DC voltage converter and the controllable switch. The AC/DC voltage converter is configured to output a DC voltage in response to the AC voltage. The DC voltage is received by the second microprocessor and the RF receiver. The RF receiver is configured to receive the first RF signal. The second microprocessor is programmed to compare the first address value to a first predetermined address value. The second microprocessor is further programmed to generate a second control signal to induce the controllable switch to transition to a closed operational position to route the AC voltage to an AC outlet device if the first address value corresponds to the first predetermined address value, and the first command value corresponds to an activation command value. The AC outlet device configured to be electrically removably coupled to the fan assembly.

A remote control system for controlling operation of a fan motor in a fan assembly in accordance with another exemplary embodiment is provided. The remote control system includes a first sensor module having a first housing, a first sensor, a first microprocessor, and a first RF transmitter. The first sensor, the first microprocessor and the first RF transmitter are disposed within the first housing. The first microprocessor is operably coupled to the first sensor and the first RF transmitter. The first microprocessor is programmed to generate a first control signal to induce the first RF transmitter to transmit a first RF signal in response to a sensor signal from the first sensor. The first RF signal has a first address value and a first command value. The remote control system further includes a fan control module that is disposed in a housing of the fan assembly. The fan control module has a second microprocessor, an AC/DC voltage converter, a controllable switch, and an RF receiver. The second microprocessor is operably coupled to the AC/DC voltage converter, the controllable switch, and the RF receiver. The AC/DC voltage converter and the controllable switch are configured to receive an AC voltage. The AC/DC voltage converter is configured to output a DC voltage in response to the AC voltage. The DC voltage is received by the second microprocessor and the RF receiver. The RF receiver is configured to receive the first RF signal. The second microprocessor is programmed to compare the first address value to a first predetermined address value. The second microprocessor is further programmed to generate a second control signal to induce the controllable switch to transition to a closed operational position to route the AC voltage to the fan motor if the first address value corresponds to the first predetermined address value, and the first command value corresponds to an activation command value.

DETAILED DESCRIPTION

First Embodiment

Figure 1:
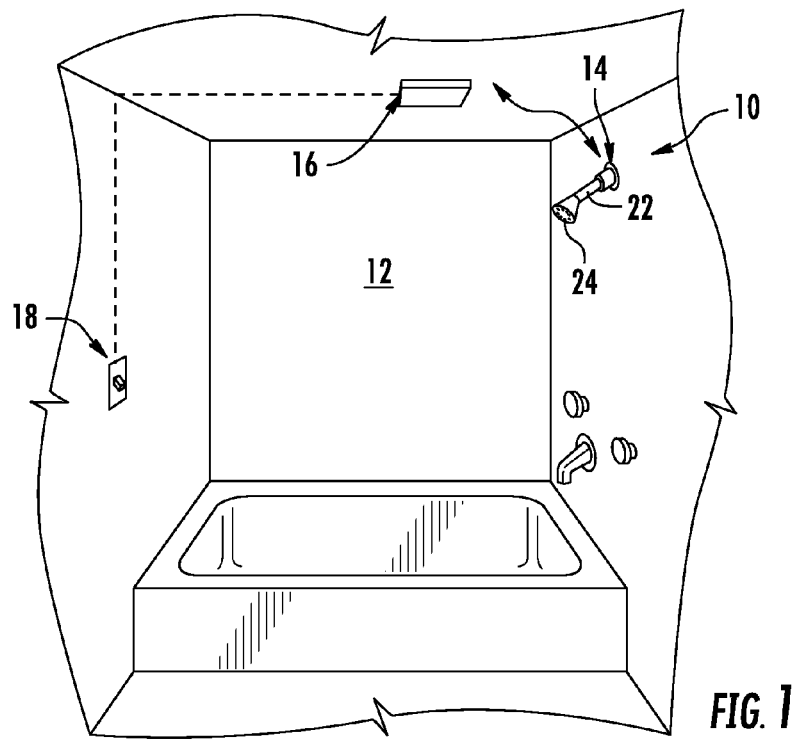
FIG. 1 is a schematic of a bathroom having an air quality control system in accordance with an exemplary embodiment.

Referring to FIG. 1, an exemplary embodiment of an air quality control system 10 is shown. In this configuration, the system 10 is incorporated with an air venting system of a bathroom 12. The system 10 includes a sensor assembly 14, a fan assembly 16 and a switch assembly 18. Optionally, the system further includes one or more circuits 20, i.e. control circuits or otherwise, for controlling or modifying signals. Other components are contemplated as described herein or otherwise. In the configuration shown in FIG. 1, the sensor assembly 14 is disposed proximate a pipe conduit 22 of a shower head 24 for monitoring fluid flow therethrough. The sensor assembly 14 is in communication with the fan assembly 16 for causing ventilation of humidity or otherwise from the bathroom 12.

Figure 2:
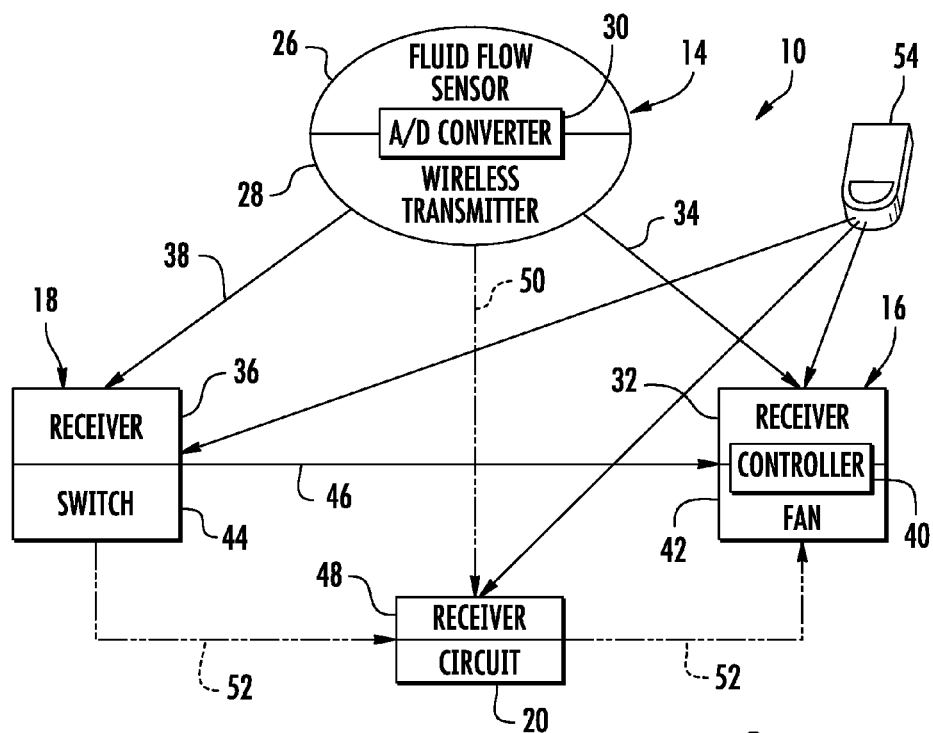
FIG. 2 is a block diagram of an air quality control system in accordance with an exemplary embodiment.

Referring to the schematic diagram of the air quality control system 10 shown in FIG. 2, the sensor assembly 14 includes a fluid flow sensor 26 configured for monitoring fluid flow through a conduit, such as pipe conduit 22 shown in FIG. 1. The sensor assembly further includes a wireless transmitter 28 in communication with the fluid flow sensor 26. The wireless transmitter 28 is configured to generate a wireless signal corresponding to measurements, or fluid flow presence, determined by fluid flow sensor 26. Optionally, it is contemplated that an analog to digital convertor 30 is provided for converting the analog signals generated by the fluid flow sensor 26 to digital signals for relay by wireless transmitter 28. However, it should be appreciated that the wireless transmitter 28 may alternatively generate analog signals, such as radio waves e.g., frequency modulated signals (FM) or amplitude modulated signals (AM), microwaves, infrared waves or otherwise. It should be appreciated that the analog to digital convertor may be disposed with, or communicatively between, any of the sensor assembly 14, fan assembly 16 or switch assembly 18. Other potential wireless communications systems useable with the present system include ZigBee®, Bluetooth®, or otherwise.

The signal generated by the wireless transmitter 28 is received by a wireless receiver 32 of the fan assembly 16 through a first wireless connection 34 or a wireless receiver 36 of the switch assembly 18 through a second or alternate wireless connection 38, or both. However, it is contemplated that the signal generated by the wireless transmitter 28 is eventually relayed in some manner to a fan controller 40 of a fan 42 for controlling ventilation of bathroom 12 or otherwise. To this extent, it is possible that the wireless receiver 36 is disposed proximate to a manual switch 44 configured for controlling the fan 42 through a wired connection 46, though communication may advantageously be achieved through a wireless communication as well. Alternatively, it is further contemplated that the circuit 20 may include a wireless receiver 48 for forming a third or alternate wireless connection 50. In this configuration, the circuit 20 is in communication with the fan assembly 16 and switch assembly 18 through a wired or wireless connection 52.

Optionally, it is contemplated that the air quality control unit 10 may include one or more remote control units 54 useable by an individual to control the fan 42 for humidity removal, odor removal or otherwise from the particular room or area. In this configuration, it is contemplated that the remote control unit may be in communication with the wireless receiver 32 of the fan assembly 16 or the wireless receiver 34 of the switch assembly 18, or both. Accordingly, a user may activate the fan 42 at any time, and/or at any location, through the remote control unit 54.

In another optional configuration, it is contemplated that sensor assembly 14, fan assembly 16 and/or switch assembly 18 includes a manual activation device 86, such as a button switch or otherwise, for causing activation of the fan assembly. In one configuration, referring to FIG. 4, the manual activation device 86 is in communication with the wireless transmitter 28 of the sensor assembly 14 for transmitting a signal based upon the manual activation device 86. In this configuration, should a user desire activation of the fan assembly 16 during times where the fan assembly 16 would not normally operate, due to low humidity levels or otherwise, the user is provided the opportunity to manually activate the fan assembly 16.

The fluid flow sensor 26 may comprise any sensor configured to determine the presence of fluid flow, particularly through a conduit. In one configuration, as described below, that the fluid flow sensor 26 may be configured to ascertain a temperature of fluid flowing through a conduit for activating the fan assembly 16. Advantageously, should the temperature of the fluid be capable of generating steam or humidity the fan assembly 16 will be activated. In another configuration, also described below, the fluid flow sensor 26 may comprise a magnetic sensor configured to sense the generation of a magnetic field based upon movement of naturally occurring minerals within a fluid flow. In yet another configuration, the fluid flow sensor 26 may comprise a vibration sensor configured to monitor whether fluid flow is occurring through a conduit, based upon known vibration values typically generated by fluid flow. In still another configuration, the fluid flow sensor 26 may comprise a pressure sensor configured to determine fluid flow through the conduit based upon increased fluid pressure generated by the fluid flow. In another configuration, the fluid flow sensor 26 may comprise a current sensor configured to sense an accumulation of static electricity over the conduit due to fluid flow therein. In another configuration, the sensor comprises a circuit, or at least a portion thereof, that is completed by the fluid flowing through the conduit. The fluid flow sensor 26 generates a signal, via a suitable power source, indicative of fluid flow that is received by transmitter 28.

In any of the above configurations, in one exemplary embodiment, it is contemplated that the sensor assembly 14, including the transmitter 28, may be powered through a battery or other suitable power means. In another exemplary embodiment, power is obtained through a generation of current by movement of fluid through the conduit. In yet another exemplary embodiment, power is obtained through a capacitor wherein potential energy stored by the capacitor is release upon fluid flow through a conduit. It is possible that a current or signals generated by the sensors are suitable in strength for powering the transmitter without or in conjunction with an additional poser source. It should be appreciated that other power sources are available. However, in a preferred configuration it is contemplated that the power source for generating signals for the sensor or through the wireless transmitter 28 includes a low voltage and/or current that poses no risk to persons, even in the presence of conducting fluids, such as water. It should be appreciated that other low voltage and/or current sensor configurations are possible.

Optionally, the sensor assembly 14 further includes a temperature indicator 84 for providing an indication of the temperature of the fluid flow through the pipe conduit 22. The temperature indicator 84 may be located on or with the sensor assembly 14, located on the pipe conduit 22 or otherwise. Accordingly, the temperature indicator 84 may be in communication with the fluid flow sensor 26 or function independently. In one configuration, the temperature indicator 84 provides a digital readout of the temperature of fluid flow through the pipe conduit 22. In another configuration the temperature indicator 84 provides a color indicator of the temperature. Other configurations are possible.

In one configuration, it is contemplated that multiple sensors may be used with the air quality control system 10. This may include one or more of the fluid flow sensors 26 described herein and optionally, one or more remote control devices and/or one or more additional sensors. Such additional sensors may comprise humidity sensors, occupancy sensors, odor sensors, temperature sensors or otherwise. The multiple sensors may be located in one or more locations within a specified region. For example, with reference to the bathroom configuration shown in FIG. 1, sensors may be disposed with pipe conduits, shower heads, sink and/or bathtub faucets, toilets, walls, ceilings, floors, mirrors, shower curtains or curtain rods, window, blinds or otherwise. In a multiple sensor configuration, it is possible that one or more, or even all, of the sensors are in wired and/or wireless communication with the fan assembly 16. Accordingly, the multiple sensors may communicate over a common frequency and/or control circuit.

The fluid flow sensor 26 may comprise a stand along component configured for attachment to a conduit or may comprise a portion of the conduit itself. Accordingly, a user may purchase a fluid flow sensor 26 that may be attached to existing conduit components, e.g., pipe member, shower head, faucet or otherwise, or may replace an existing conduit component, e.g., pipe member, shower head, faucet or otherwise. To this end, in one configuration the sensor may be integrally formed with the conduit or may be separately formed for attachment to the conduit. As such, the fluid flow sensor 26 may be in direct or indirect contact with the fluid flowing through a conduit. Further, in one exemplary embodiment, the sensor is in-line with the fluid flowing through the conduit, wherein fluid passes on one or more sides of the sensor or even substantially about the entirety of the sensor.

Figure 3:
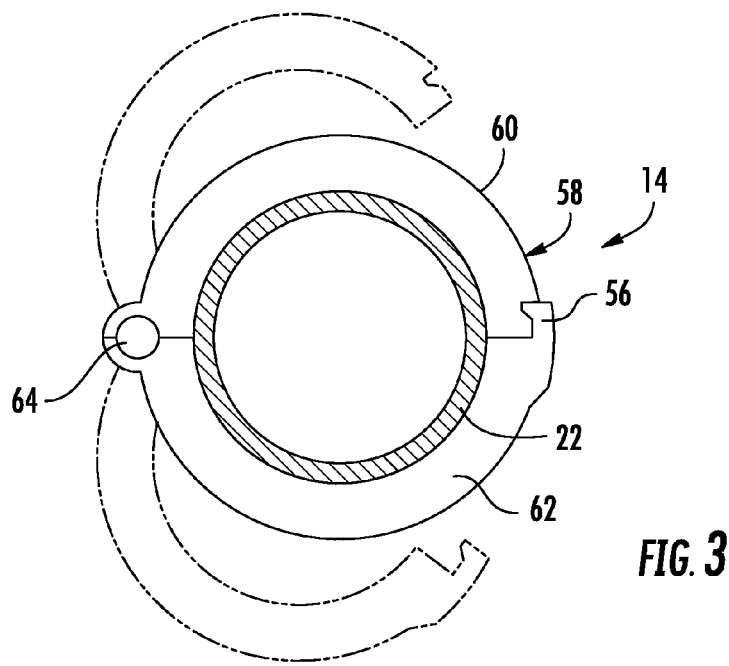
FIG. 3 is a schematic of a fluid flow sensor utilized in the air quality control system of FIG. 1.
Figure 4:
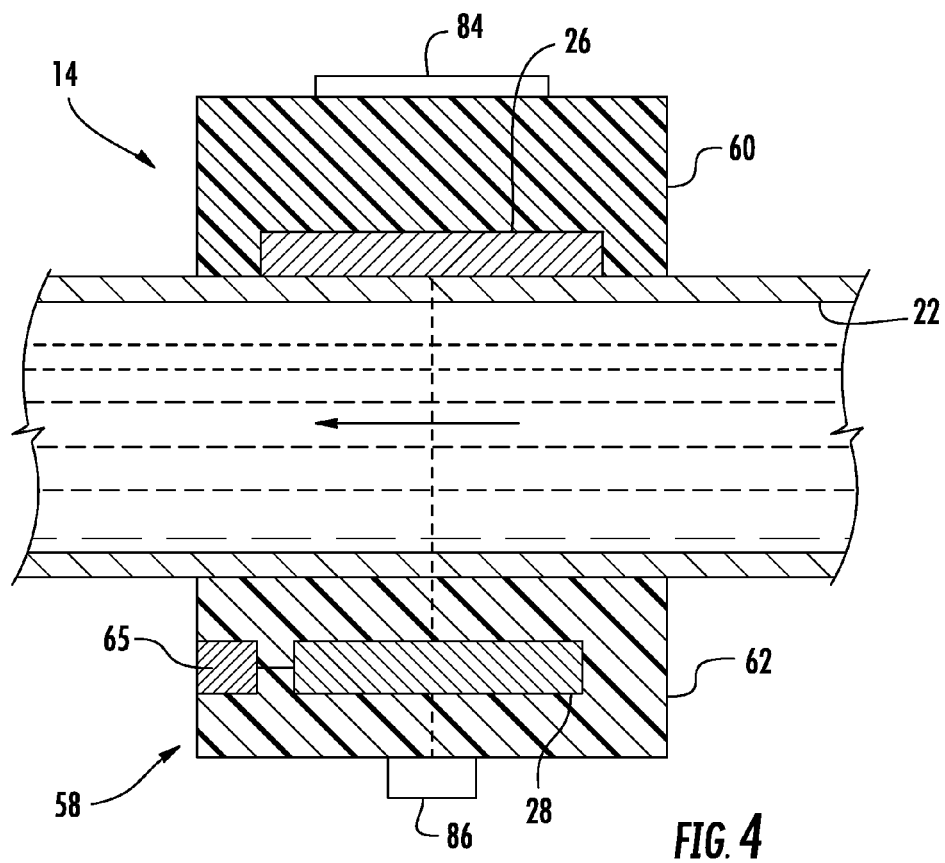
FIG. 4 is a cross-sectional view of the fluid flow sensor of FIG. 3.

In one sensor configuration, referring to FIGS. 3 and 4, the sensor assembly 14 is configured for attachment to the pipe conduit 22 of the shower head 24. The sensor assembly 14 is removably attached to the pipe conduit 22 through a locking mechanism 54. The locking mechanism 54 comprises a snap-fit configuration; however, it is also contemplated that adhesives (such as thermally conductive adhesive or otherwise) and/or fasteners may be alternatively or used in conjunction with the snap-fit configuration. In the particular configuration shown, the sensor assembly 14 includes a shell 58 having a first half 60 attached to a second half 62 through a hinge 64. The first and second half 60, 62 are configured to envelope the pipe conduit 22 and maintain position of the first and second half 60, 62 through the locking mechanism 56.

With reference to FIG. 4, the first half 60 of the sensor assembly 14 includes the fluid flow sensor 26 for detecting fluid flow through the pipe conduit 22. The fluid flow sensor 26 is located proximate the pipe conduit 22 and more particularly in thermal communication with the pipe conduit 22. Accordingly, changes in temperature of the pipe conduit 22, as a result of fluid flow therethrough, can be measured by the fluid flow sensor 26. In this configuration, the fluid flow sensor 22 may comprise a thermistor for monitoring change in resistance through the fluid flow sensor 26 to determine the temperature of the fluid flowing through the pipe conduit 22. The fluid flow sensor may alternatively comprise a stress sensor that monitors expansion of the sensor, via expansion of the pipe conduit 22, as a result of heated fluid, to determine the temperature of the fluid flowing through the pipe conduit. The fluid flow sensor is in communication with the wireless transmitter 28 for transmitting the measurement, or activation signal, from the fluid flow sensor 26 to the fan assembly 16. The shell is further configured for receiving a battery 63 for providing power to the fluid flow sensor 26 and/or wireless transmitter 28. However, as previously described, other power sources are contemplated as described herein.

Alternatively, in another configuration, the fluid flow sensor 26 comprises a magnetic flux sensor and is placed in magnetic communication with the fluid flowing through the pipe conduit 22 for monitoring magnetic flux generated by the fluid flow through the pipe conduit. In this configuration, the fluid flow sensor 26 is able to determine the presence of fluid flow through the pipe conduit 22 as a result of the flow of magnetic elements naturally flowing with the water through the pipe conduit, such as iron or otherwise.

Figure 5:
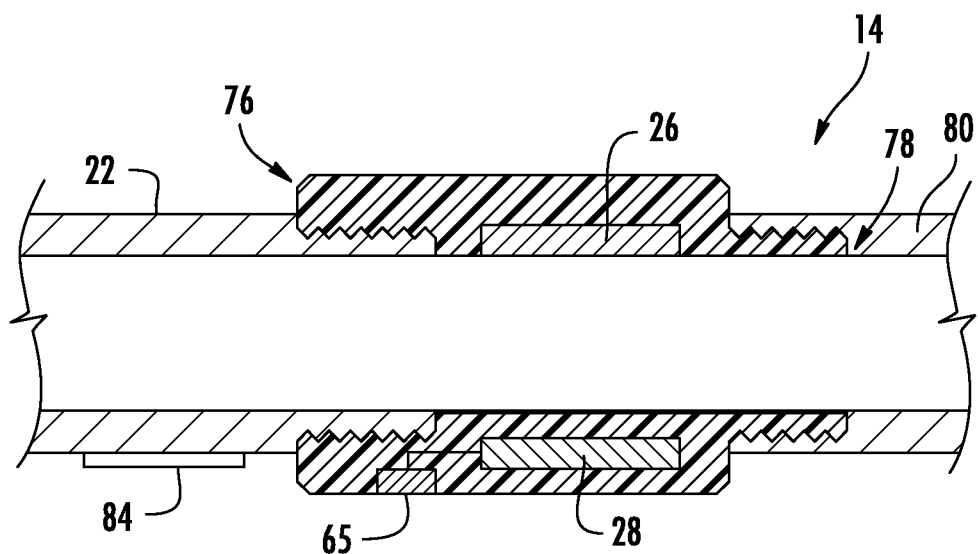
FIG. 5 is a cross-sectional view of another fluid flow sensor.

In another sensor configuration, referring to FIG. 5, the sensor assembly 14 is configured for threaded attachment to a conduit, e.g. one or more pipe conduits 22 and/or shower heads 24. As with the embodiment shown in FIGS. 3 and 4, this configuration provides easy installment of the sensor assembly 14 to an existing pluming system of a house or otherwise. In the particular configuration shown, the sensor assembly includes a first end 76 having a female threaded component configured for engagement with a pipe conduit 22 extending from a shower head and a second end 78 having a male threaded component configured for engagement with a fluid source pipe conduit 80. The sensor includes a fluid flow sensor 26 that is in communication with a wireless transmitter 28 configured for generation of a wireless signal based upon signals generated by the fluid flow sensor 26. Optionally, the fluid flow sensor 26, transmitter or both may be powered by battery 65 or otherwise. In this configuration, the fluid flow sensor 26 is in direct contact with fluid flowing through pipe conduit 22.

Figure 6:
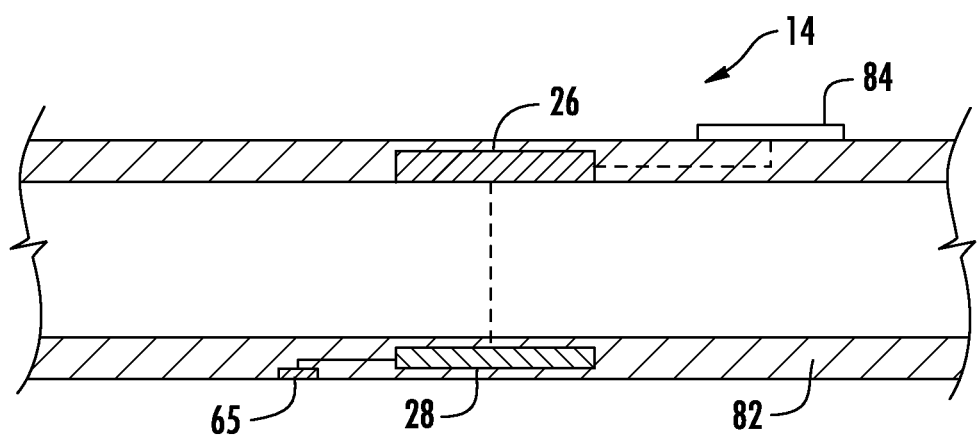
FIG. 6 is a cross-sectional view of still another fluid flow sensor.

In still another sensor configuration, referring to FIG. 6, the sensor assembly 14 is integrally formed with an additional pipe member 82, which may be used to replace all, or a portion of, pipe conduit 22, fluid source pipe conduit 80 or otherwise. The sensor assembly 14 includes fluid flow sensor 26 in communication with wireless transmitter 28, wherein either one of the fluid flow sensor, wireless transmitter or both may be powered by battery 65 or otherwise. As with the sensor assembly configuration shown in FIG. 5, the fluid flow sensor 26 is in direct contact with fluid flowing through pipe conduit 22.

Figure 7:
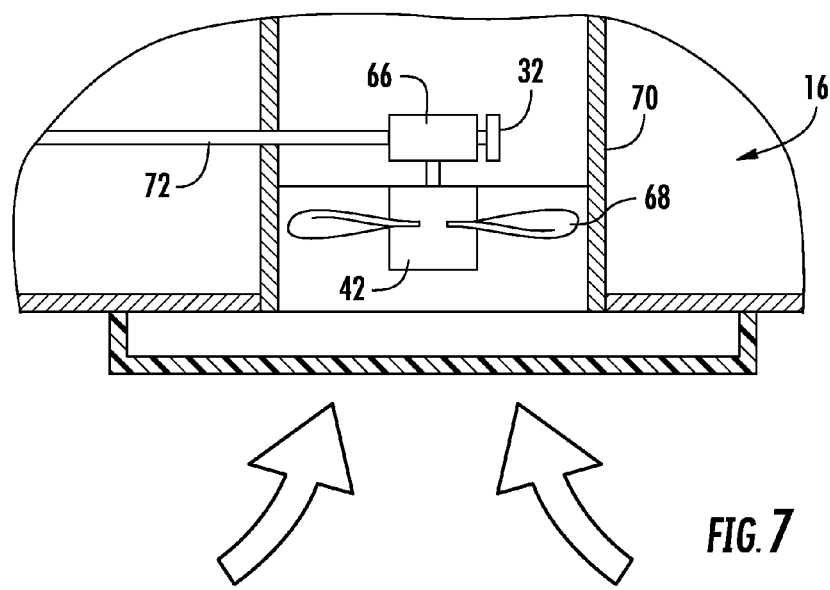
FIG. 7 is a schematic of a fan assembly utilized in the bathroom of FIG. 1.

Referring to FIG. 7, the exemplary fan assembly 16 of the air quality control system 10 is shown. The fan assembly 16 includes wireless receiver 32 configured for receiving signals from the wireless transmitter 28 of the fluid flow sensor 26. The wireless receiver 32 is in communications with controller 40 (see FIG. 2) that controls operation of a motor 66 for rotating fan blades 68. The fan assembly 16 is housed within a vent 70 for drawing air from the bathroom through the vent and to a location outside of the bathroom, e.g., house or otherwise. The fan assembly is powered through a wire 72 that may be connected to the switch assembly 18, as described herein. Accordingly, the controller 40 may be activated by the wireless transmitter 28 directly or indirectly through the switch assembly 18 or independent of the switch assembly 18. Further the controller 40 may be activated through a manual switch, such as switch 44 of the switch assembly 18.

Figure 8:
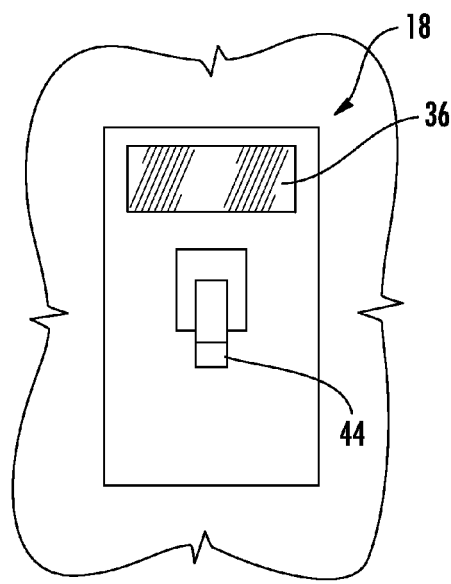
FIG. 8 is a schematic of a switch assembly utilized in the bathroom of FIG. 1.
Figure 9:
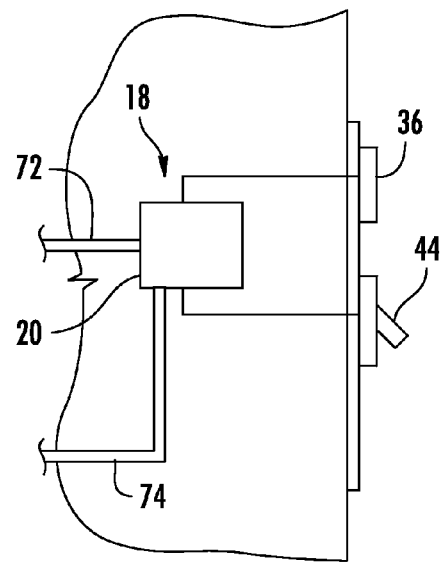
FIG. 9 is a side view of the switch assembly of FIG. 8.

Referring to FIGS. 8 and 9, several views of the exemplary switch assembly 18 of the air quality control system 10 are shown. The switch assembly 18 includes wireless receiver 36 for receiving signals from the sensor assembly 14. The switch assembly 18 includes manual switch 44 for manually activating the fan assembly 14. The wireless receiver 36 and the manual switch 44 are connected to the fan assembly 18, via wire 72, for controlling activation thereof. Accordingly, the switch assembly 18 is further connected to a power supply (not shown) through a power supply wire 74. It should be appreciated that the switch assembly 18 may further include a circuit 76 for controlling transmission of signals, or power, from the manual switch 44 and/or wireless receiver 36 to the fan controller 40.

In one configuration, referring to FIG. 2, it is contemplated that the fan assembly 16 is controllable through one or more remote control units 54, which may or may not be in conjunction with the sensor assembly 14. This provides the ability of a user to control activation of the fan assembly separate from the sensor assembly 14. Activation of the fan assembly may be based upon humidity levels, odor levels or other contaminate or non-contaminant occurrence within the bathroom 12, or other room or area. The remote control unit 54 may be in direct communication with the fan assembly 16 or indirect communication with the fan assembly, such as through switch assembly 18 or otherwise.

The air quality control system 10 automatically detects the presence or anticipated accumulation of humidity within a bathroom 12, or otherwise, and activates the fan assembly 16 until sufficient removal of the humidity is achieved and/or for a predetermined time period. In one method of operation, referring to FIG. 1, a user directs water through a pipe conduit 22 of a shower head 24. The sensor assembly determines the presence of water flow through the pipe conduit 22, and/or temperature of the water flowing through the pipe conduit 22, to further determine whether activation of a fan assembly is necessary for reducing or maintain humidity levels within the bathroom 12. Should reduction of humidity within the bathroom 12 be desired, a wireless signal is sent to the fan assembly 16 directly, or through switch assembly 18, to cause activation of the fan assembly. When flow of water through the pipe conduit 22 is discontinued, or the temperature of water flowing through the pipe conduit 22 is at a level where humidity accumulation is not likely, or even the humidity or contaminant levels have decreased to acceptable levels, another signal may be transmitted directly or indirectly to the fan assembly 16 to deactivate the fan assembly immediately or after a predetermined time period. Alternatively, as described above, the fan may simply deactivate after a predetermined time period.

It should be appreciated that the fan assembly 16 may comprise a new or altered fan assembly. Similarly, the switch assembly 18 may comprise a new or altered switch assembly. To this end, it is contemplated that the components of the sensor assembly 14 may be sold as a kit along with components of the fan assembly 16 and/or switch assembly 18 for providing an individual with a simplified method of forming an air quality control system 10.

It should be appreciated that while the air quality control system 10 is shown incorporated with a venting system of a bathroom, it should be appreciate that the system may be used in other rooms or environment including open areas, closed areas, multi-room areas or otherwise. Similarly, the fluid flow sensor 26 may be used on other conduits, including gas or liquid, to determine characteristics (i.e. temperatures, composition or otherwise) of the fluid flow. Specific examples of other conduits include water or gas lines, for houses or other building structure, or otherwise.

Second Embodiment

Figure 10:
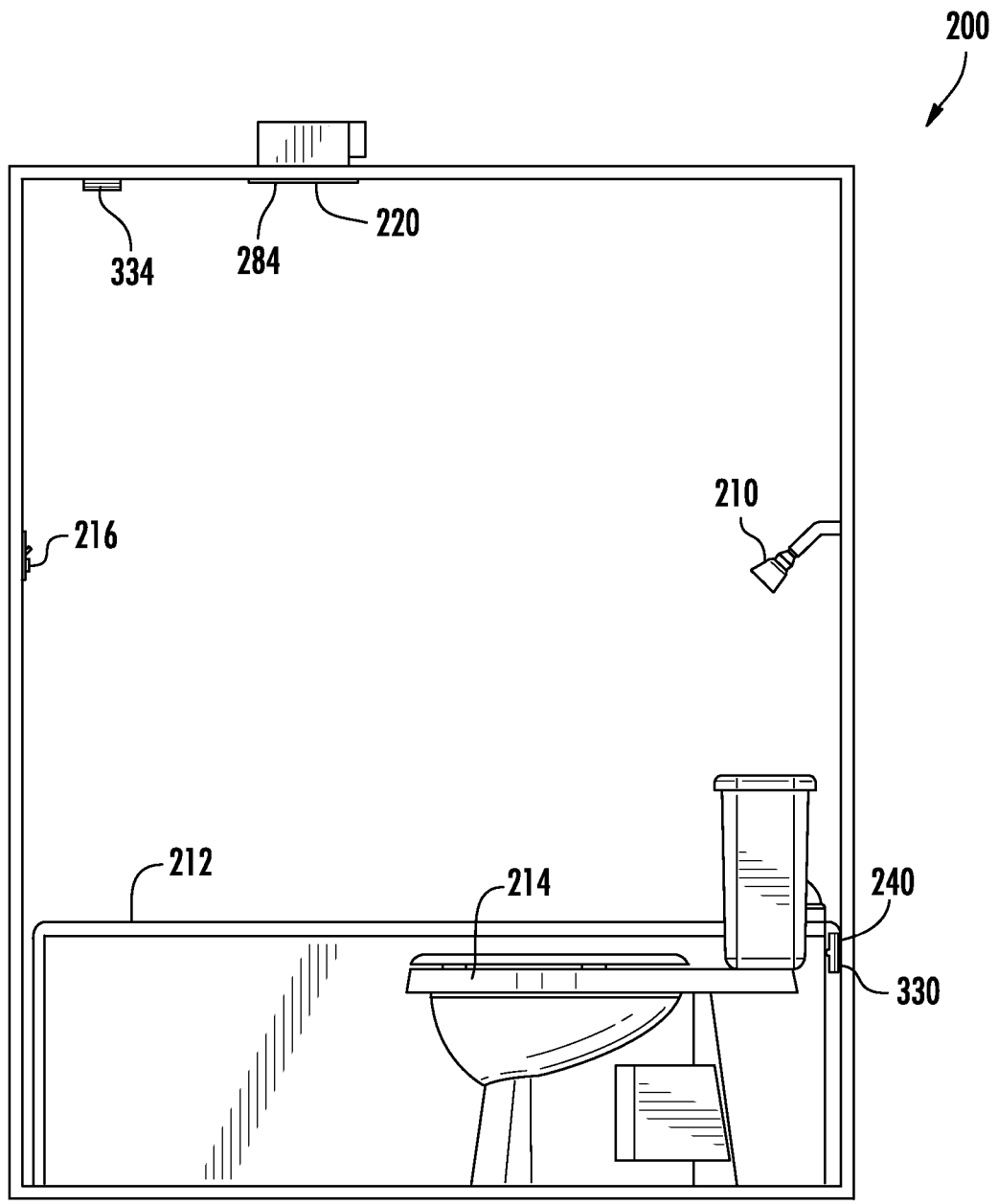
FIG. 10 is a schematic of another bathroom that utilizes a remote control system for controlling operation of a fan assembly in accordance with another exemplary embodiment.
Figure 11:
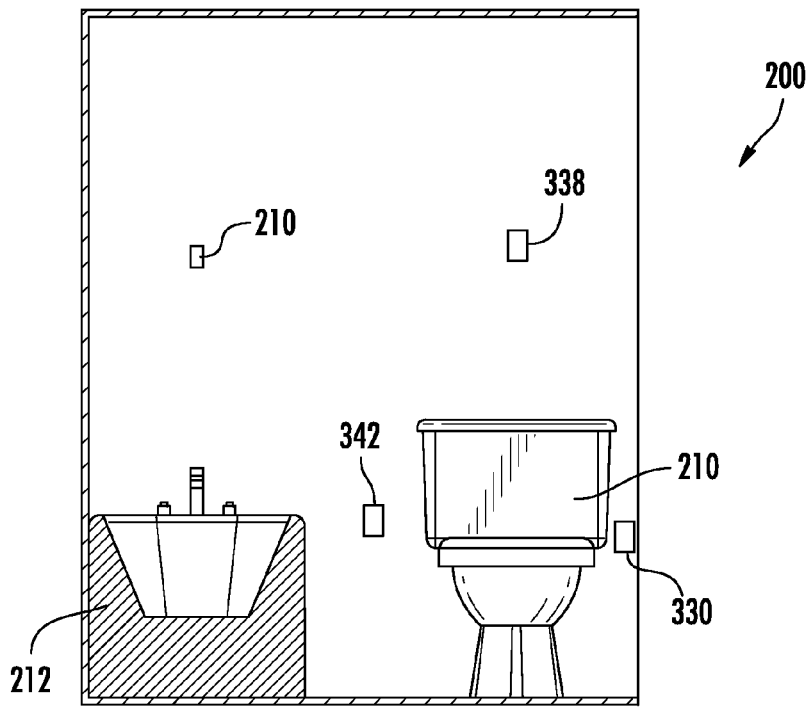
FIG. 11 is another schematic of the bathroom of FIG. 10.
Figure 12:
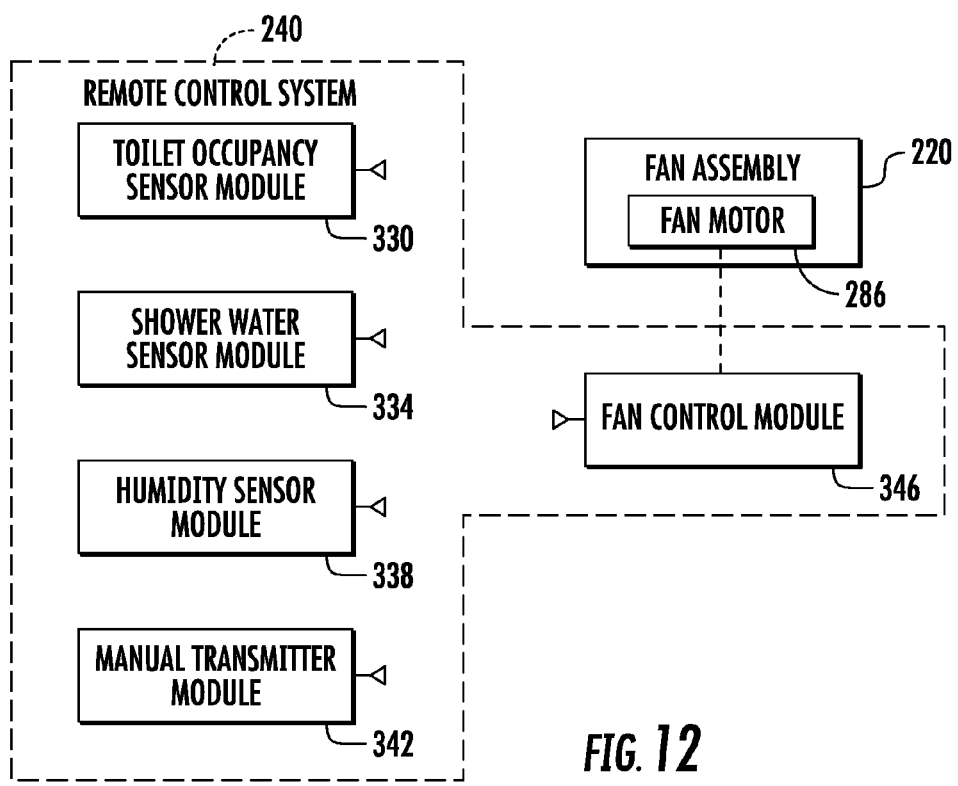
FIG. 12 is a block diagram of a remote control system in accordance with another exemplary embodiment that is utilized in the bathroom of FIG. 10.

Referring to FIGS. 10-12, a bathroom 200 includes a shower head 210, a tub 212, a toilet 214, a fan switch 216, a fan assembly 220, and a remote control system 240 in accordance with an exemplary embodiment. An advantage of the remote control system 240 is that the system 240 can remotely control operation of the fan assembly 220, based on a humidity level in the bathroom 200, a sensed heat energy from water being expelled from the shower head 210, or sensed heat energy from a person disposed proximate to the toilet 214.

The shower head 210 is disposed on a wall of the bathroom 200 and is configured to expel heated water into the tub 212. The toilet 214 is disposed on a floor in the bathroom 200 and is configured to be utilized by a person sitting on the toilet 214.

The fan switch 216 is mounted on a wall of the bathroom 200 and is configured to provide an AC voltage to a fan control module 346 (shown in FIG. 12), when the fan switch 216 has a closed operational position.

Fan Assembly

Referring to FIGS. 10 and 26-28, the fan assembly 220 is provided to expel air from an interior of the bathroom 200 to the ambient atmosphere outside of the bathroom 200. The fan assembly 220 is coupled to a ceiling of the bathroom 200. The fan assembly 220 includes a housing 270, an outlet pipe 274, a partition wall 278, fan blades 282, a vented cover plate 284 (shown in FIG. 10), an electric motor 286, an AC power plug 290, an AC electrical wire 294, and an AC socket 298.

The housing 270 is configured to hold the partition wall 278, the fan blades 282, the electric motor 286, the AC power plug 290, the AC electric wire 294, and the AC socket 298 therein. The housing 270 includes side walls 301, 302, 303, 304 coupled to one another that define an interior region 305. The outlet pipe 274 is coupled to the side wall 304 and fluidly communicates with an aperture extending through the side wall 304. The partition wall 278 is disposed within the interior region 305 and is coupled to the side walls 301-304 such that the partition wall 278 partitions the interior region into first and second interior spaces. The partition wall 278 includes apertures 306, 308, 310 (shown in FIG. 28) extending therethrough. The partition walls 301-304 define an open end 317 and open end 318. The open end 318 is configured to have the vented cover plate 284 (shown in FIG. 10) coupled thereto that communicates with an interior of the bathroom 200. The open end 317 is configured to be disposed above a ceiling of the bathroom 200.

The fan blades 282 are operably coupled to the electric motor 286. The fan blades 282 are disposed in the first interior space and are operably coupled to a rotor of the electric motor 286.

The electric motor 286 is coupled to the partition wall 278 in the second interior space. The AC electrical wire 294 has first and second electrical conductors (e.g., wires) therein that are covered by a plastic sheath and are electrically isolated from one another in the sheath. The first and second electrical conductors of the AC electrical wire 294 are electrically coupled to the blades 312, 314, respectively, and are further electrically coupled to the electric motor 286. The first and second electrical conductors of the AC electrical wire 294 transmits an AC voltage from the AC power plug 290 to the electric motor 286. The AC power plug 290 includes blades 312, 314 for receiving an AC voltage therebetween from the fan control module 346.

Figure 26:
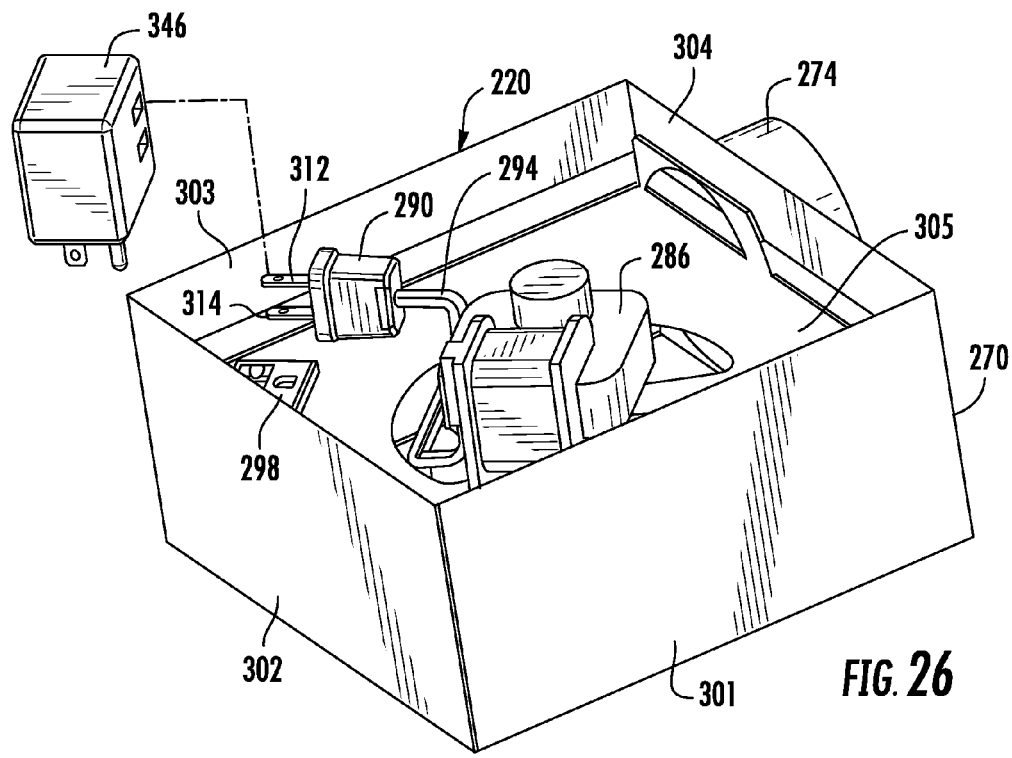
FIG. 26 is a schematic of a fan assembly and the fan control module of FIG. 21.
Figure 27:
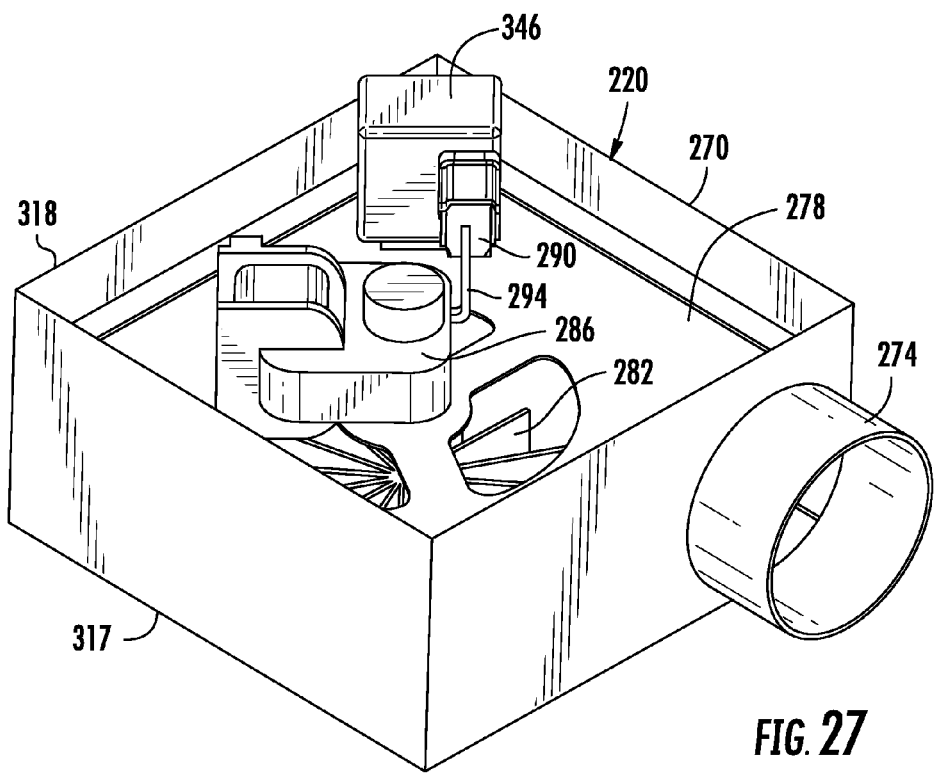
FIG. 27 is another schematic of the fan assembly and the fan control module of FIG. 21.
Figure 28:
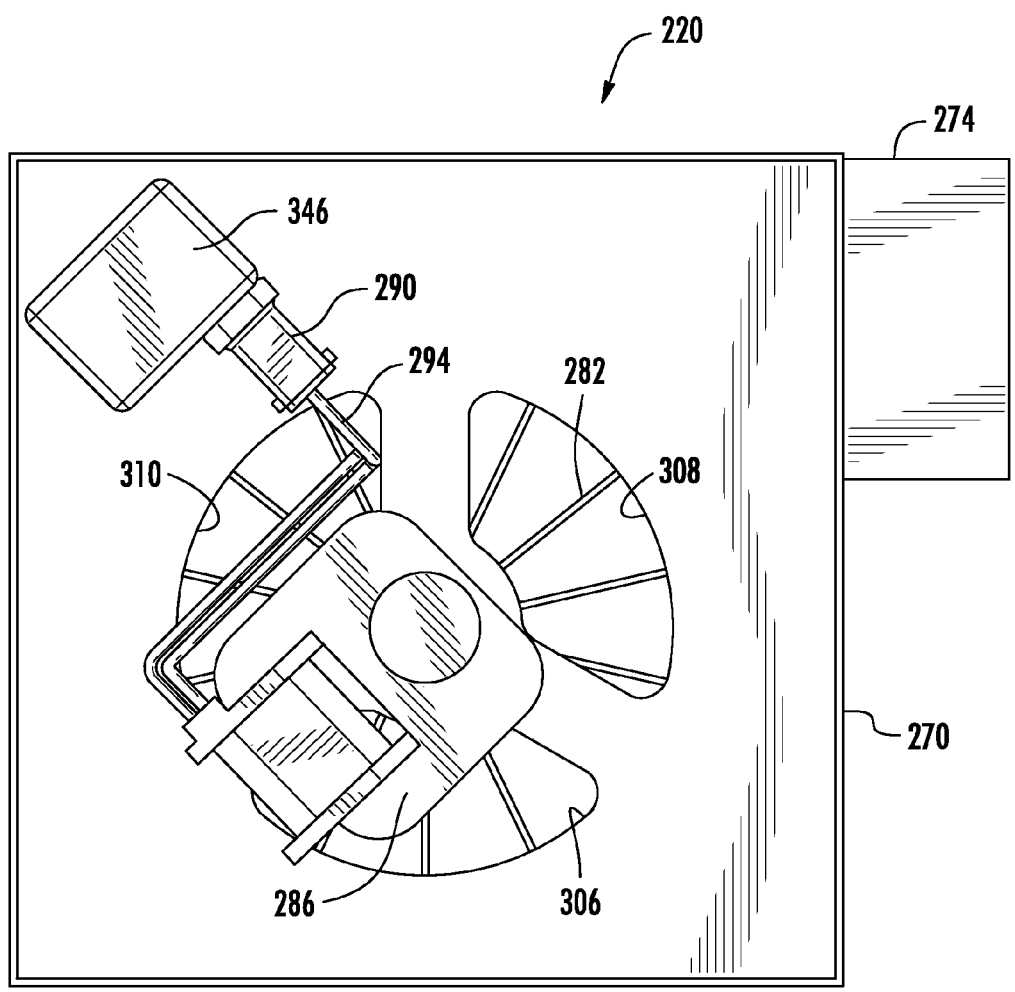
FIG. 28 is another schematic of the fan assembly and the fan control module of FIG. 21.
Figure 29:
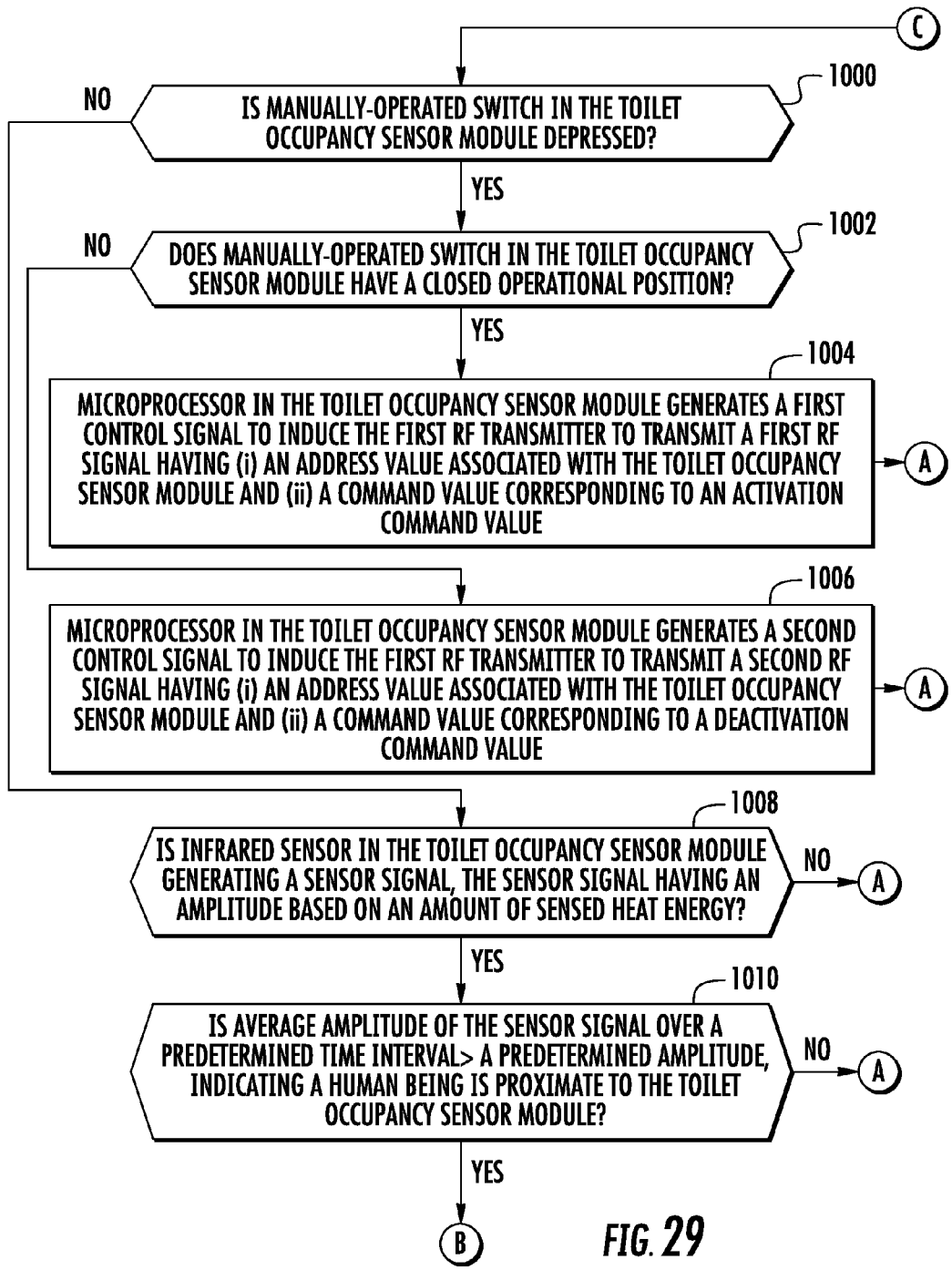
FIGS. 29-31 are flowcharts of a method for controlling operation of the toilet occupancy sensor module of FIG. 13.
Figure 30:
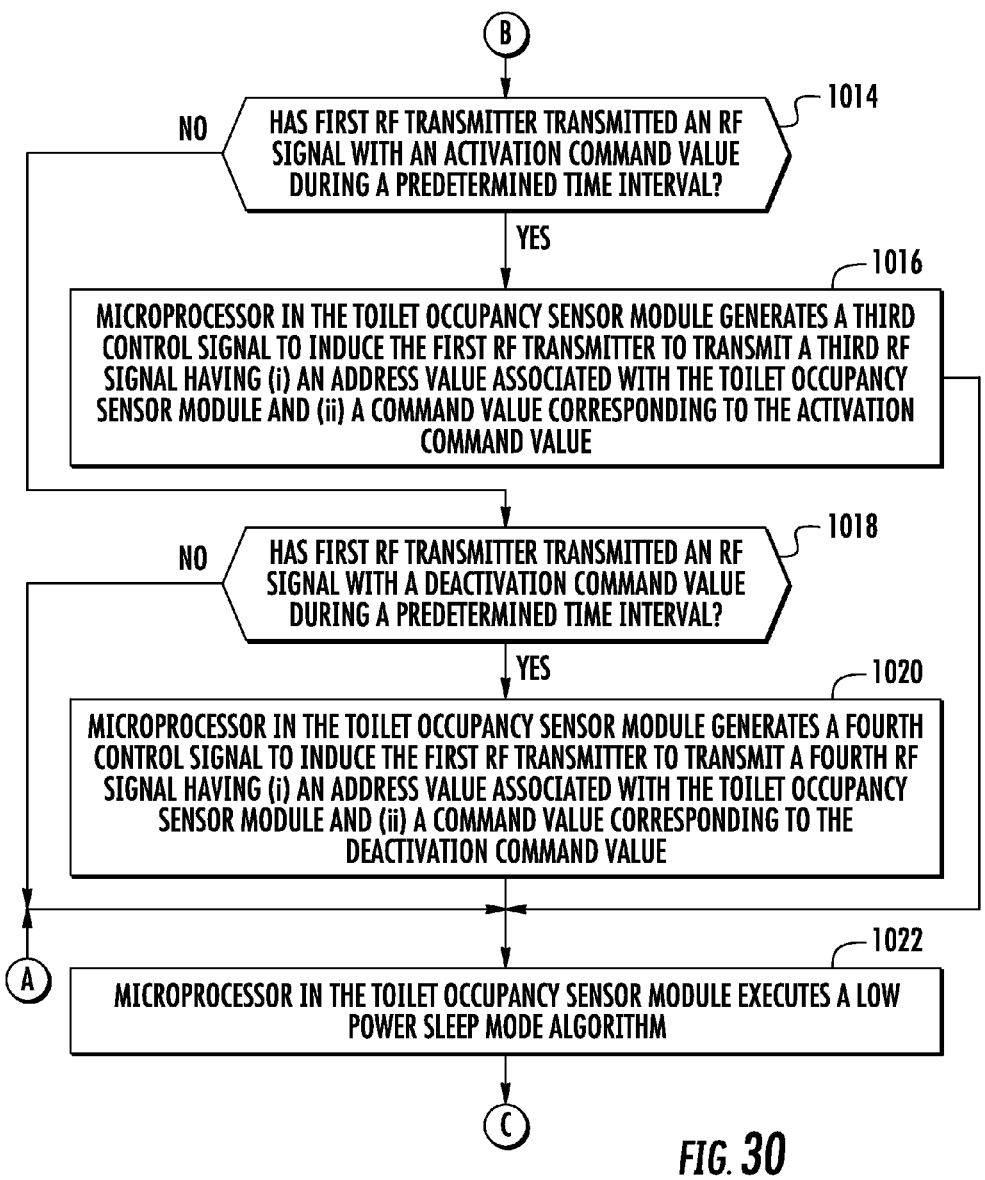

Referring to FIGS. 10 and 26, the AC socket 298 (shown in FIG. 26) is coupled to the partition wall 278. The fan switch 216 (shown in FIG. 10) is electrically coupled through a pair of electrical conductors (not shown) to the AC socket 298. The fan control module 346 is electrically coupled to the AC socket 298 utilizing the AC power plug 788 which is removably electrically coupled to the AC socket 298. When the fan switch 216 has a closed operational position, the switch 216 supplies an AC voltage from an external AC voltage source to the AC socket 298, which energizes the fan control module 346 via the AC power plug 788. During normal operation of the fan control module 346 described in the flowcharts herein, the fan switch 216 has the closed operational position such that AC socket 298 receives the AC voltage and energizes the fan control module 346 via the AC power plug 788.

When the electric motor 286 is activated by the remote control system 240, the fan blades 282 urge air from the interior of the bathroom 200 through the vented cover plate 284, the apertures 306, 308, 310, and past the fan blades 282 and through the outlet pipe 274 into a region above the ceiling of the bathroom 200.

Referring to FIGS. 10-12, the remote control system 240 is provided to control operation of the fan assembly 220. The remote control system 240 includes a toilet occupancy sensor module 330, a shower water sensor module 334, a humidity sensor module 338, a manual transmitter module 342, and a fan control module 346.

Toilet Occupancy Sensor Module

Referring to FIGS. 10 and 12-14, the toilet occupancy sensor module 330 is provided to detect when a person is disposed on the toilet 214 and to transmit an RF signal to the fan control module 346 to activate the electric motor 286 when the person is disposed on the toilet 214. The toilet occupancy sensor module 330 is further provided to detect when the person is no longer disposed on the toilet 214 to transmit an RF signal to the fan control module 346 to deactivate the electric motor 286 when the person is no longer disposed on the toilet 214. The toilet occupancy sensor module 330 includes a housing 380, a microprocessor 384, a switch 388, a battery 392, an address switch assembly 396, an RF transmitter 400, an antenna 404, and an infrared sensor 408.

The microprocessor 384 is provided to control operation of the toilet occupancy sensor module 330. The microprocessor 384 is operably and electrically coupled to the battery 392, the RF transmitter 400, the infrared sensor 408, the switch 388, and the address switch assembly 396. The microprocessor 384 includes an internal memory 385 that is configured to store executable software instructions and data utilized by the toilet occupancy sensor module 330.

The battery 392 is electrically coupled to the microprocessor 384, the RF transmitter 400, and the infrared sensor 408. The battery 392 provides an operational voltage to the microprocessor 384, the RF transmitter 400, and the infrared sensor 408.

The switch 388 is electrically coupled to and between the microprocessor 384 and electrical ground. When the switch 388 is moved to a closed operational position, the microprocessor 384 generates a control signal to induce the RF transmitter 400 to transmit an RF signal having an activation command for turning on the electric motor 286 in the fan assembly 220. Alternately, when the switch 388 is moved to an open operational position, the microprocessor 384 generates a control signal to induce the RF transmitter 400 to transmit an RF signal having a deactivation command for turning off the electric motor 286 in the fan assembly 220. A portion of the switch 388 extends outwardly from an exterior of the housing 380 and can be actuated by a person holding the housing 380.

The address switch assembly 396 is electrically coupled to the microprocessor 384. The address switch assembly 396 includes address switches 410, 412, 414, 416, 418, 420, 422, 424 which define an 8-bit binary address value which identifies the toilet occupancy sensor module 330 to the fan control module 346. In an exemplary embodiment, the address value of "11111111" is associated with the toilet occupancy sensor module 330.

The RF transmitter 400 is operably coupled to the antenna 404. The RF transmitter 400 is provided to transmit RF signals to the fan control module 346 such that the fan control module 346 can either activate or deactivate the electric motor 286 in the fan assembly 220. The microprocessor 384 is programmed to generate a control signal to induce the RF transmitter 400 to transmit an RF signal having a binary address value and a binary command value. In an exemplary embodiment, the binary address value is 8-bit binary number determined by the address switches 410-424. Further, the binary command value is 8-bit binary number comprising either an activation command value (e.g., 000000011) or a deactivation command value (e.g., 000000001). The activation command value is utilized by the fan control module 346 for activating the electric motor 286. The deactivation command value is utilized by the fan control module 346 for deactivating the electric motor 286.

In an exemplary embodiment, the RF transmitter 400 transmits RF signals in a high frequency range (e.g., 3 Mhz-30 MHz). Of course, in an alternative embodiment, the RF transmitter 400 could transmit RF signals in another frequency range. In an exemplary embodiment, the RF transmitter 400 modulates each RF signal to include data (e.g., an address value and a command value) utilizing frequency shift keying (FSK) modulation technique. In an alternative embodiment, the RF transmitter 400 can modulate each RF signal to include data utilizing any other known modulation technique such as amplitude modulation (AM), frequency modulation (FM), and amplitude shift keying (ASK), or the like.

The infrared sensor 408 is electrically coupled to the microprocessor 384. The infrared sensor 408 is configured to generate a sensor signal having an amplitude based on an amount of sensed human body heat energy. The microprocessor 384 is programmed to measure the amplitude of the sensor signal from the infrared sensor 408. If the amplitude of the sensor signal is greater than or equal to a predetermined amplitude, the microprocessor 384 determines that a person is disposed proximate to the infrared sensor 408. Alternately, if the amplitude of the sensor signal is less than the predetermined amplitude, the microprocessor 384 determines that a person is not disposed proximate to the infrared sensor 408.

Referring to FIGS. 13, 14 and 29-31, a method for controlling operation of the toilet occupancy sensor module 330 will now be described.

At step 1000, the microprocessor 384 makes a determination as to whether the manually-operated switch 388 in the toilet occupancy sensor module 330 is depressed. If the value of step 1000 equals "yes", the method advances to step 1002. Otherwise, the method advances to step 1008.

At step 1002, the microprocessor 384 makes a determination as to whether the manually-operated switch 388 in the toilet occupancy sensor module 330 has a closed operational position. If the value of step 1002 equals "yes", the method advances to step 1004. Otherwise, the method advances to step 1006.

At step 1004, the microprocessor 384 generates a first control signal to induce the first RF transmitter 400 to transmit a first RF signal having (i) an address value associated with the toilet occupancy sensor module 330 and (ii) a command value corresponding to an activation command value. After step 1004, the method advances to step 1022.

Referring again to step 1002, if the value of step 1002 equals "no", the method advances to step 1006. At step 1006, the microprocessor 384 in the toilet occupancy sensor module 330 generates a second control signal to induce the first RF transmitter 400 to transmit a second RF signal having (i) the address value associated with the toilet occupancy sensor module 330 and (ii) a command value corresponding to a deactivation command value. After step 1006, the method advances to step 1022.

Referring again to step 1000, if the value of step 1000 equals "no", the method advances to step 1008. At step 1008, the microprocessor 384 makes a determination as to whether the infrared sensor 408 in the toilet occupancy sensor module 330 is generating a sensor signal. The sensor signal has an amplitude based on an amount of sensed heat energy. If the value of step 1008 equals "yes", the method advances to step 1010. Otherwise, the method advances to step 1022.

At step 1010, the microprocessor 384 makes a determination as to whether the average amplitude of the sensor signal over a predetermined time interval is greater than a predetermined amplitude, indicating a human being is proximate to the toilet occupancy sensor module 330. If the value of step 1010 equals "yes", the method advances to step 1014. Otherwise, the method advances to step 1022.

At step 1014, the microprocessor 384 makes a determination as to whether the first RF transmitter 400 has transmitted an RF signal with an activation command value during a predetermined time interval. If the value of step 1014 equals "yes", the method advances to step 1016. Otherwise, the method advances to step 1018.

At step 1016, the microprocessor 384 generates a third control signal to induce the first RF transmitter 400 to transmit a third RF signal having (i) an address value associated with the toilet occupancy sensor module 330 and (ii) a command value corresponding to the activation command value. After step 1016, the method advances to step 1022.

Referring again to step 1014, if the value of step 1014 equals "no", the method advances to step 1018. At step 1018, the microprocessor 384 makes a determination as to whether the first RF transmitter 400 has transmitted an RF signal with a deactivation command value during the predetermined time interval. If the value of step 1018 equals "yes", the method advances to step 1020. Otherwise, the method advances to step 1022.

At step 1020, the microprocessor 384 generates a fourth control signal to induce the first RF transmitter 400 to transmit a fourth RF signal having (i) an address value associated with the toilet occupancy sensor module 330 and (ii) a command value corresponding to the deactivation command value. After step 1020, the method advances to step 1022.

At step 1022, the microprocessor 384 executes a low power sleep mode algorithm. After step 1022, the method returns to step 1000.

Figure 13:
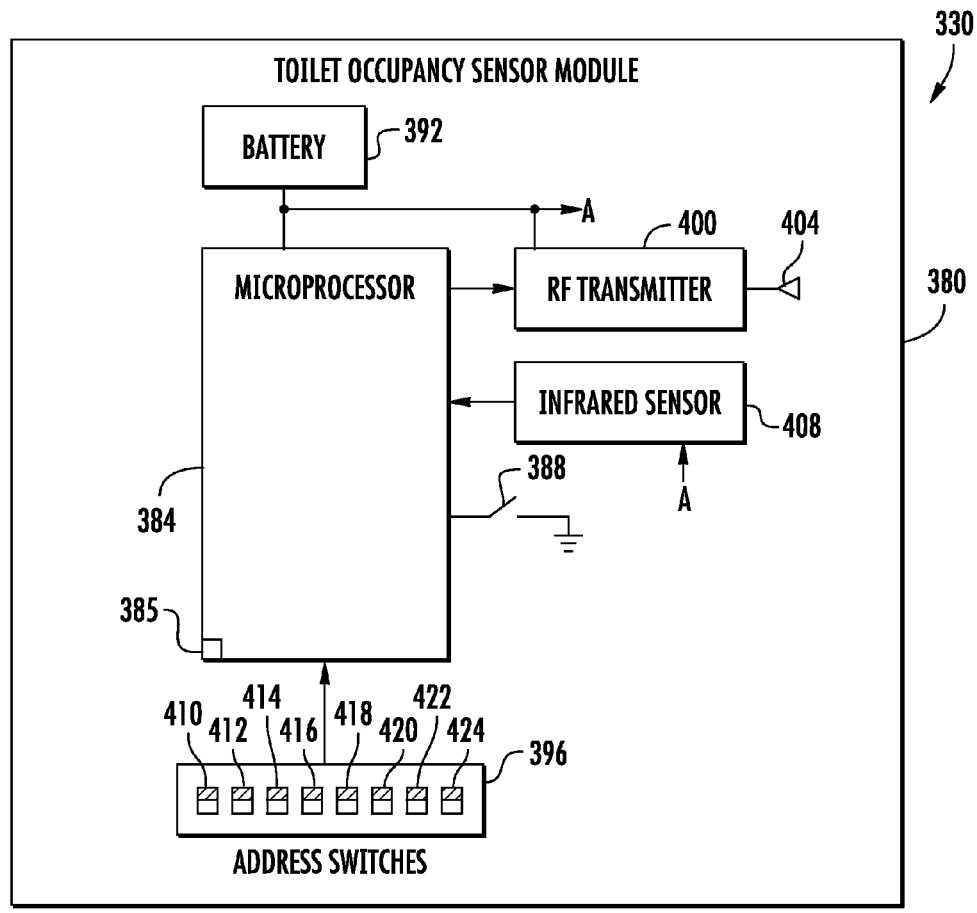
FIG. 13 is a block diagram of a toilet occupancy sensor module utilized in the remote control system of FIG. 12.
Figure 14:
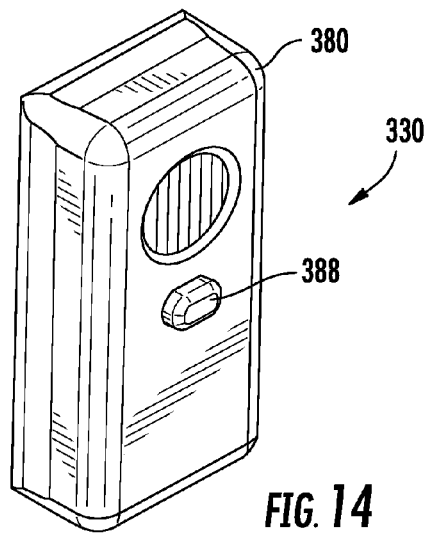
FIG. 14 is a schematic of the toilet occupancy sensor module of FIG. 13.
Figure 31:
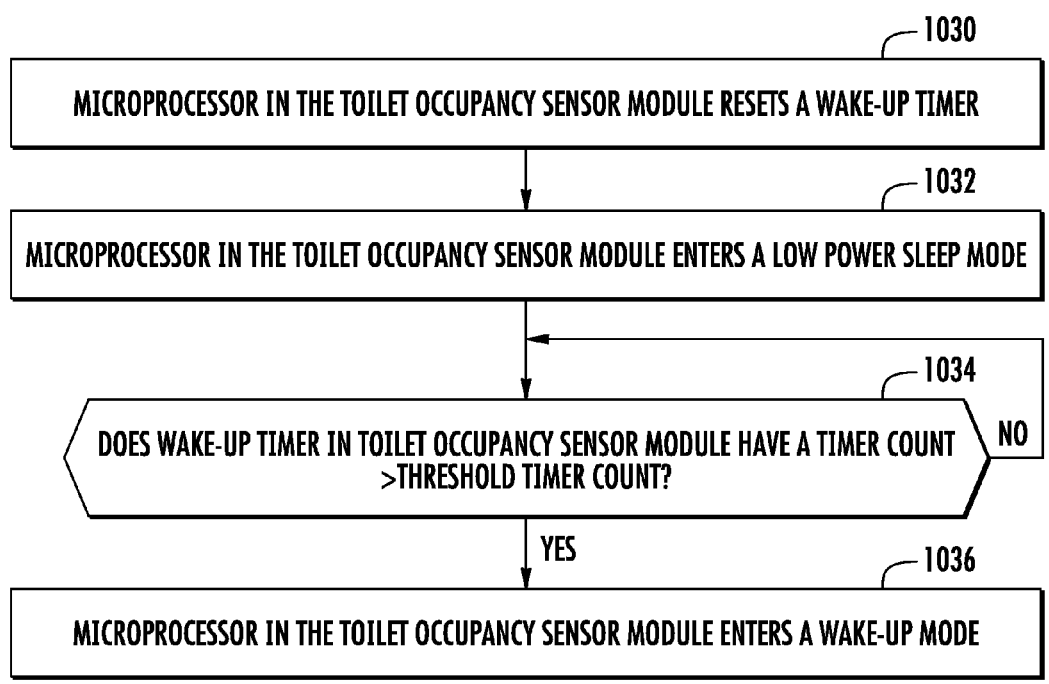
Figure 32:
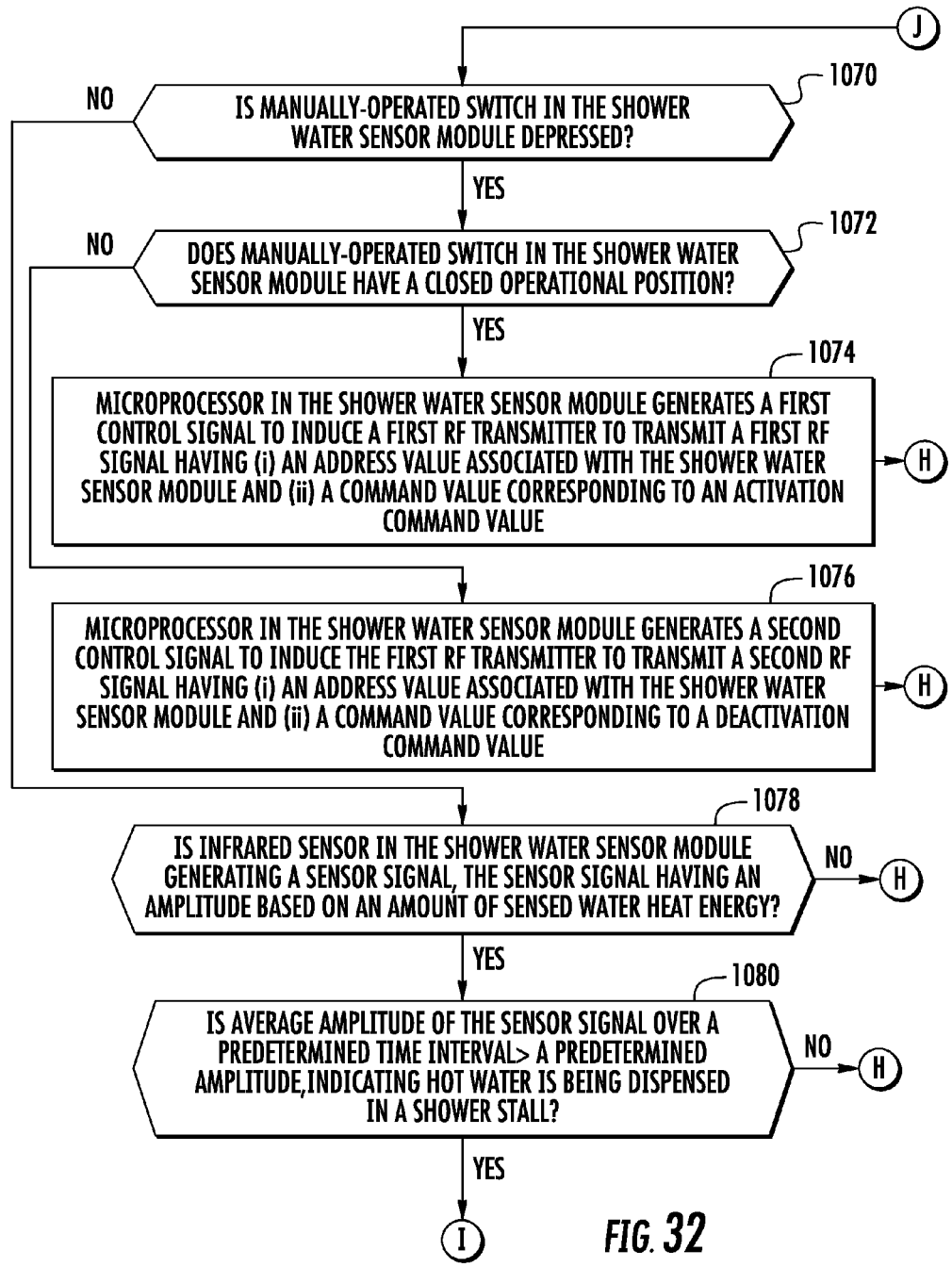
FIGS. 32-34 are flowcharts of a method for controlling operation of the shower water sensor module of FIG. 15.
Figure 33:
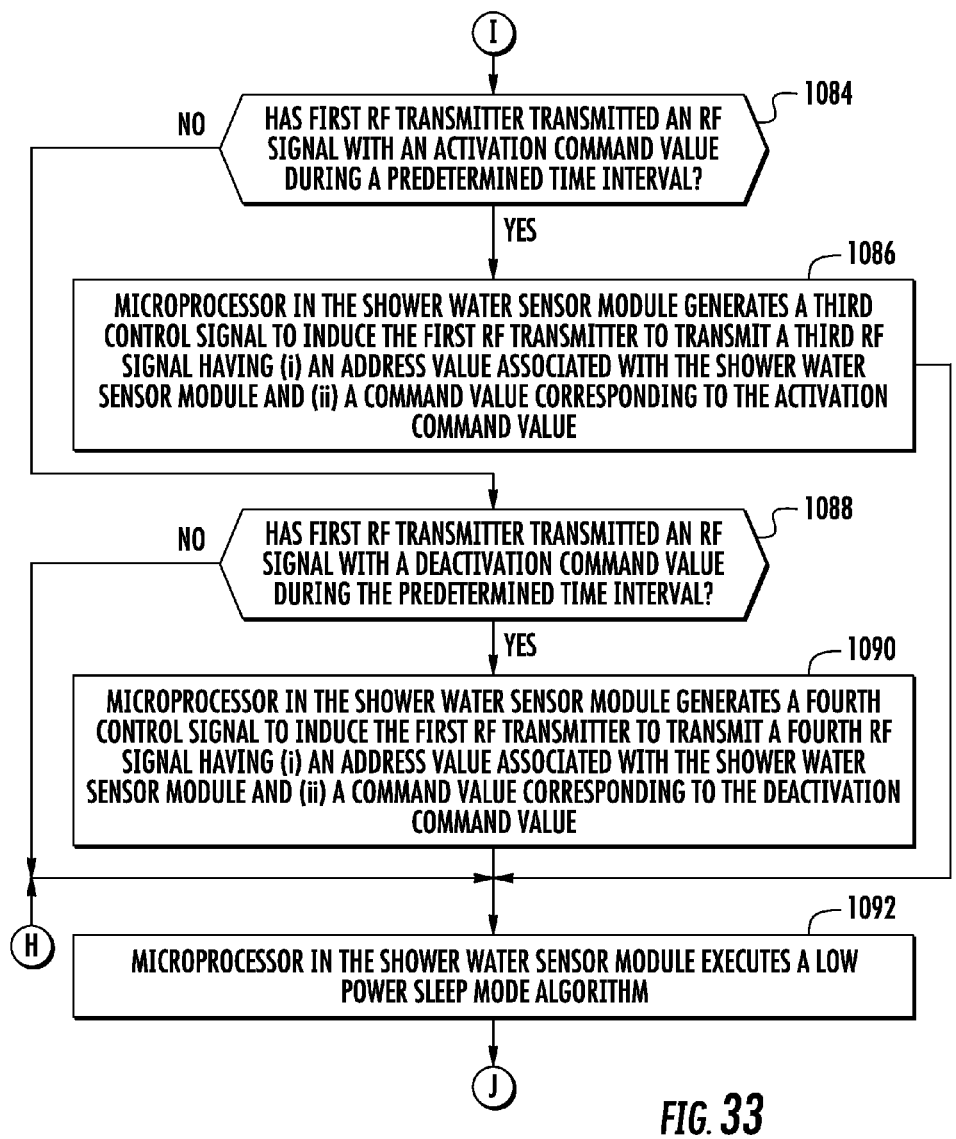

Referring to FIGS. 13 and 31, the low-power sleep mode algorithm of step 1022 will now be explained.

At step 1030, the microprocessor 384 resets a wake-up timer. After step 1030, the method advances to step 1032.

At step 1032, the microprocessor 384 enters a low power sleep mode. After step 1032, the method advances step 1034.

At step 1034, the microprocessor 384 makes a determination as to whether the wake-up timer in the toilet occupancy sensor module 330 has a timer count greater than a threshold timer count. If the value of step 1034 equals "yes", the method advances to step 1036. Otherwise, the method returns to step 1034.

At step 1036, the microprocessor 384 enters a wake-up mode. After step 1036, the method returns to step 1000 (shown in FIG. 29).

Shower Water Sensor Module

Referring to FIGS. 10, 12, 15 and 16, the shower water sensor module 334 is provided to detect when the shower head 210 is expelling heated water based on detected heat energy, and to transmit an RF signal to the fan control module 346 to activate the electric motor 286 when the shower head 210 is expelling heated water. The shower water sensor module 334 is further provided to detect when the shower head 210 is no longer expelling heated water and to transmit an RF signal to the fan control module 346 to deactivate electric motor 286 when the shower head 210 and is no longer expelling heated water. The shower water sensor module 334 includes a housing 480, a microprocessor 484, a switch 488, a battery 492, an address switch assembly 496, an RF transmitter 500, an antenna 504, and an infrared sensor 508.

The microprocessor 484 is provided to control operation of the shower water sensor module 334. The microprocessor 484 is operably and electrically coupled to the battery 492, the RF transmitter 500, the infrared sensor 508, the switch 488, and the address switch assembly 496. The microprocessor 484 includes an internal memory 485 that is configured to store executable software instructions and data utilized by the shower water sensor module 334.

The battery 492 is electrically coupled to the microprocessor 484, the RF transmitter 500, and the infrared sensor 508. The battery 492 provides an operational voltage to the microprocessor 484, the RF transmitter 500, and the infrared sensor 508.

The switch 488 is electrically coupled to and between the microprocessor 484 and electrical ground. When the switch 488 is moved to a closed operational position, the microprocessor 484 generates a control signal to induce the RF transmitter 500 to transmit an RF signal having an activation command for turning on the electric motor 286 in the fan assembly 220. Alternately, when the switch 488 is moved to an open operational position, the microprocessor 484 generates a control signal to induce the RF transmitter 500 to transmit an RF signal having a deactivation command for turning off the electric motor 286 in the fan assembly 220. A portion of the switch 488 extends outwardly from an exterior of the housing 480 and can be actuated by a person holding the housing 480.

The address switch assembly 496 is electrically coupled to the microprocessor 484. The address switch assembly 496 includes address switches 510, 512, 514, 516, 518, 520, 522, 524 which define an 8-bit binary address value which identifies the shower water sensor module 334 to the fan control module 346. In an exemplary embodiment, the address value of "11111110" is associated with the shower water sensor module 334.

The RF transmitter 500 is operably coupled to the antenna 504. The RF transmitter 500 is provided to transmit RF signals to the fan control module 346 such that the fan control module 346 can either activate or deactivate the electric motor 286 in the fan assembly 220. The microprocessor 484 is programmed to generate a control signal to induce the RF transmitter 500 to transmit an RF signal having a binary address value and a binary command value. In an exemplary embodiment, the binary address value is 8-bit binary number determined by the address switches 510-524. Further, the binary command value is 8-bit binary number comprising either an activation command value (e.g., 000000011) or a deactivation command value (e.g., 000000001). The activation command value is utilized by the fan control module 346 for activating the electric motor 286. The deactivation command value is utilized by the fan control module 346 for deactivating the electric motor 286.

In an exemplary embodiment, the RF transmitter 500 transmits RF signals in a high frequency range (e.g., 3 Mhz-30 MHz). Of course, in an alternative embodiment, the RF transmitter 500 could transmit RF signals in another frequency range. In an exemplary embodiment, the RF transmitter 500 modulates each RF signal to include data (e.g., an address value and a command value) utilizing frequency shift keying (FSK) modulation technique. In an alternative embodiment, the RF transmitter 500 can modulate each RF signal to include data utilizing any other known modulation technique such as amplitude modulation (AM), frequency modulation (FM), and amplitude shift keying (ASK), or the like.

The infrared sensor 508 is electrically coupled to the microprocessor 484. The infrared sensor 508 is configured to generate a sensor signal having an amplitude based on an amount of sensed water heat energy. The microprocessor 484 is programmed to measure the amplitude of the sensor signal from the infrared sensor 508. If the amplitude of the sensor signal is greater than or equal to a predetermined amplitude, the microprocessor 484 determines that the shower head 210 (shown in FIG. 10) is dispensing heated water proximate to the infrared sensor 508. Alternately, if the amplitude of the sensor signal is less than a predetermined amplitude, the microprocessor 484 determines that the shower head 210 is not dispensing heated water proximate to the infrared sensor 508.

Referring to FIGS. 15, 16 and 32-34, a method for controlling operation of the shower water sensor module 334 will now be described.

At step 1070, the microprocessor 484 makes a determination as to whether the manually-operated switch 488 in the shower water sensor module 334 is depressed. If the value step 1070 equals "yes", the method advances to step 1072. Otherwise, the method advances to step 1078.

At step 1072, the microprocessor 484 makes a determination as to whether the manually-operated switch 488 in the shower water sensor module 334 has a closed operational position. If the value of step 1072 equals "yes", the method advances to step 1074. Otherwise, the method advances to step 1076.

At step 1074, the microprocessor 484 generates a first control signal to induce the first RF transmitter 500 to transmit a first RF signal having (i) an address value associated with the shower water sensor module 334 and (ii) a command value corresponding to an activation command value. After step 1074, the method advances to step 1092.

Referring again to step 1072, if the value of step 1072 equals "no", the method advances to step 1076. At step 1076, the microprocessor 484 generates a second control signal to induce the first RF transmitter 500 to transmit a second RF signal having (i) the address value associated with the shower water sensor module 334 and (ii) a command value corresponding to a deactivation command value. After step 1076, the method advances to step 1092.

Referring again to step 1070, if the value step 1070 equals "no", the method advances to step 1078. At step 1078, the microprocessor 484 makes a determination as to whether the infrared sensor 508 in the shower water sensor module 334 is generating a sensor signal. The sensor signal has an amplitude based on an amount of sensed water heat energy. If the value of step 1078 equals "yes", the method advances to step 1080. Otherwise, the method advances to step 1092.

At step 1080, the microprocessor 484 makes a determination as to whether the average amplitude of the sensor signal over a predetermined time interval is greater than a predetermined amplitude, indicating hot water is being dispensed from the showerhead 210 in a shower stall. If the value of step 1080 equals "yes", the method advances to step 1084. Otherwise, the method advances to step 1092.

At step 1084, the microprocessor 484 makes a determination as to whether the first RF transmitter 500 transmitted an RF signal with an activation command value during a predetermined time interval. If the value of step 1084 equals "yes", the method advances to step 1086. Otherwise, the method advances to step 1088.

At step 1086, the microprocessor 484 generates a third control signal to induce the first RF transmitter 500 to transmit a third RF signal having (i) an address value associated with the shower water sensor module 334 and (ii) a command value corresponding to the activation command value. After step 1086, the method advances to step 1092.

Referring again to step 1084, if the value of step 1084 equals "no", the method advances to step 1088. At step 1088, the microprocessor 484 makes a determination as to whether the first RF transmitter 500 has transmitted an RF signal with a deactivation command value during the predetermined time interval. If the value of step 1088 equals "yes", the method advances to step 1090. Otherwise, the method advances to step 1092.

At step 1090, the microprocessor 484 generates a fourth control signal to induce the first RF transmitter 500 to transmit a fourth RF signal having (i) an address value associated with the shower water sensor module 334 and (ii) a command value corresponding to the deactivation command value. After step 1090, the method advances to step 1092.

At step 1092, the microprocessor 484 executes a low power sleep mode algorithm. After step 1092, the method returns to step 1070.

Figure 15:
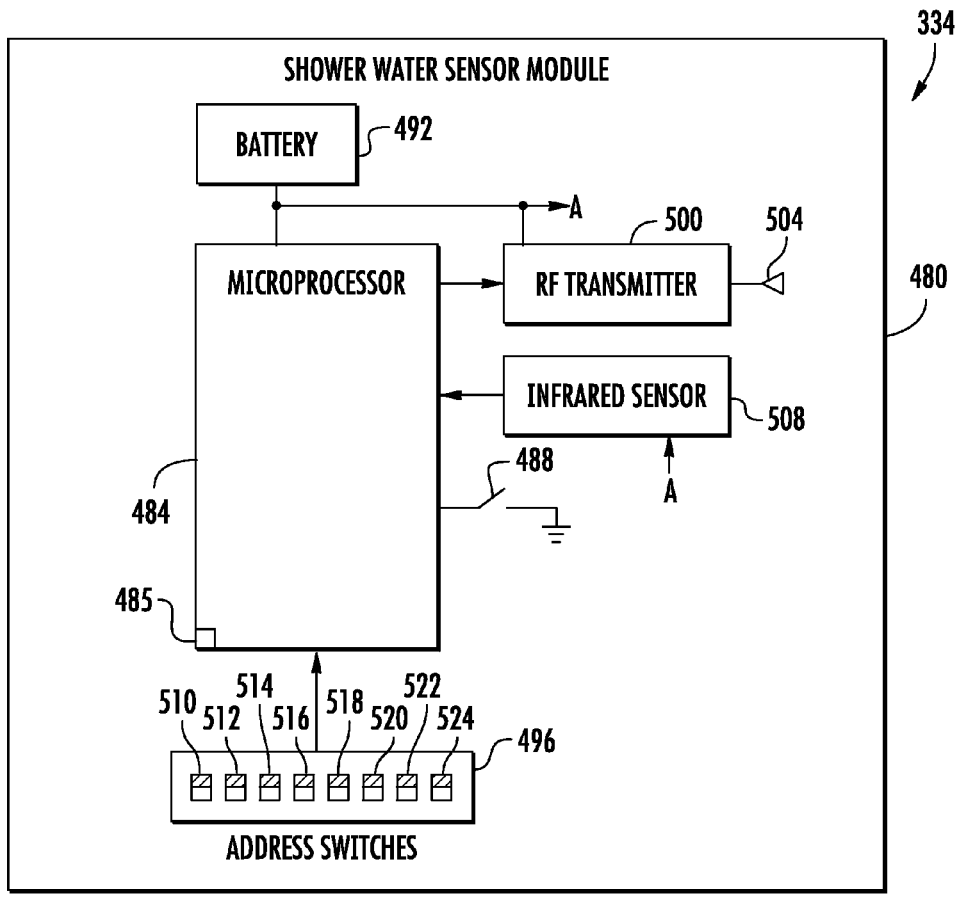
FIG. 15 is a block diagram of a shower water sensor module utilized in the remote control system of FIG. 12.
Figure 16:
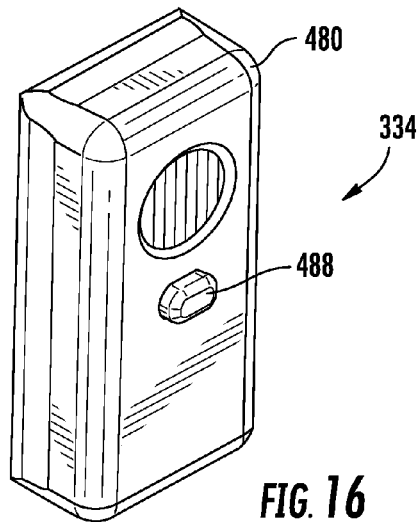
FIG. 16 is a schematic of the shower water sensor module of FIG. 15.
Figure 34:
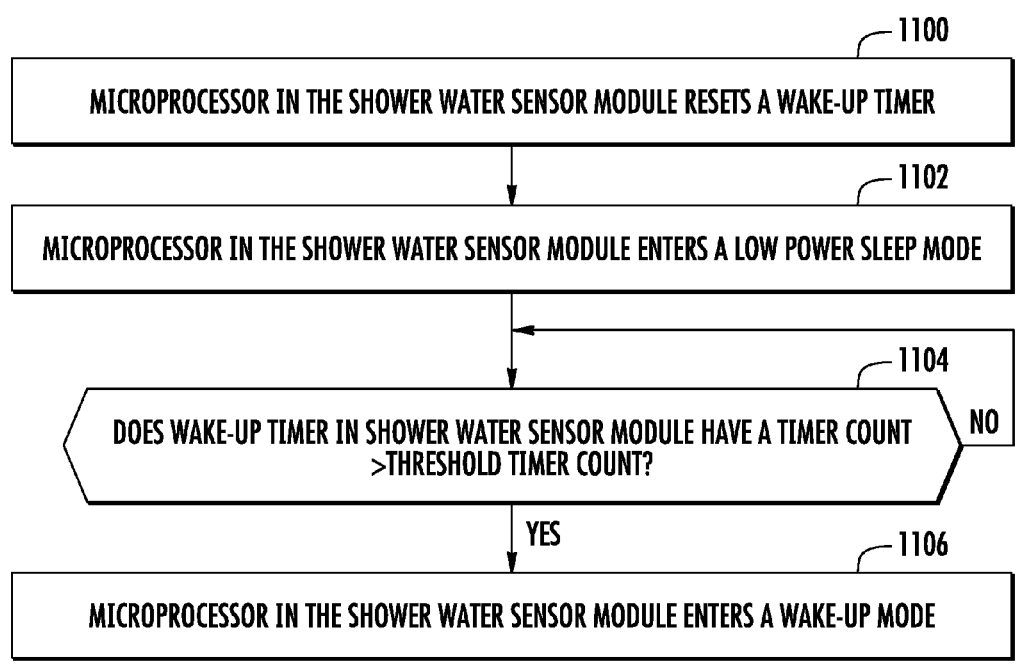
Figure 35:
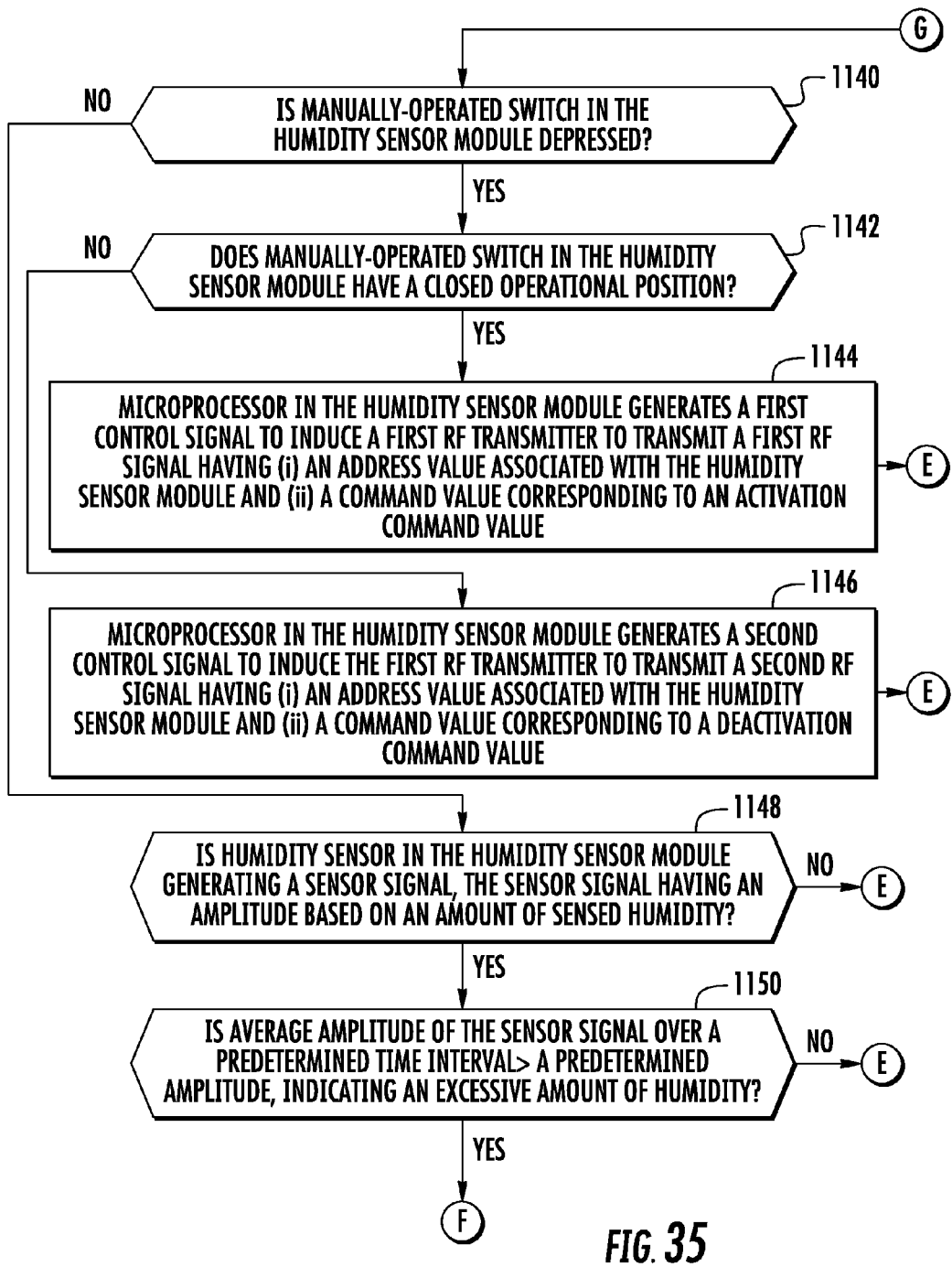
FIGS. 35-37 are flowcharts of a method for controlling operation of the humidity sensor module of FIG. 17.
Figure 36:
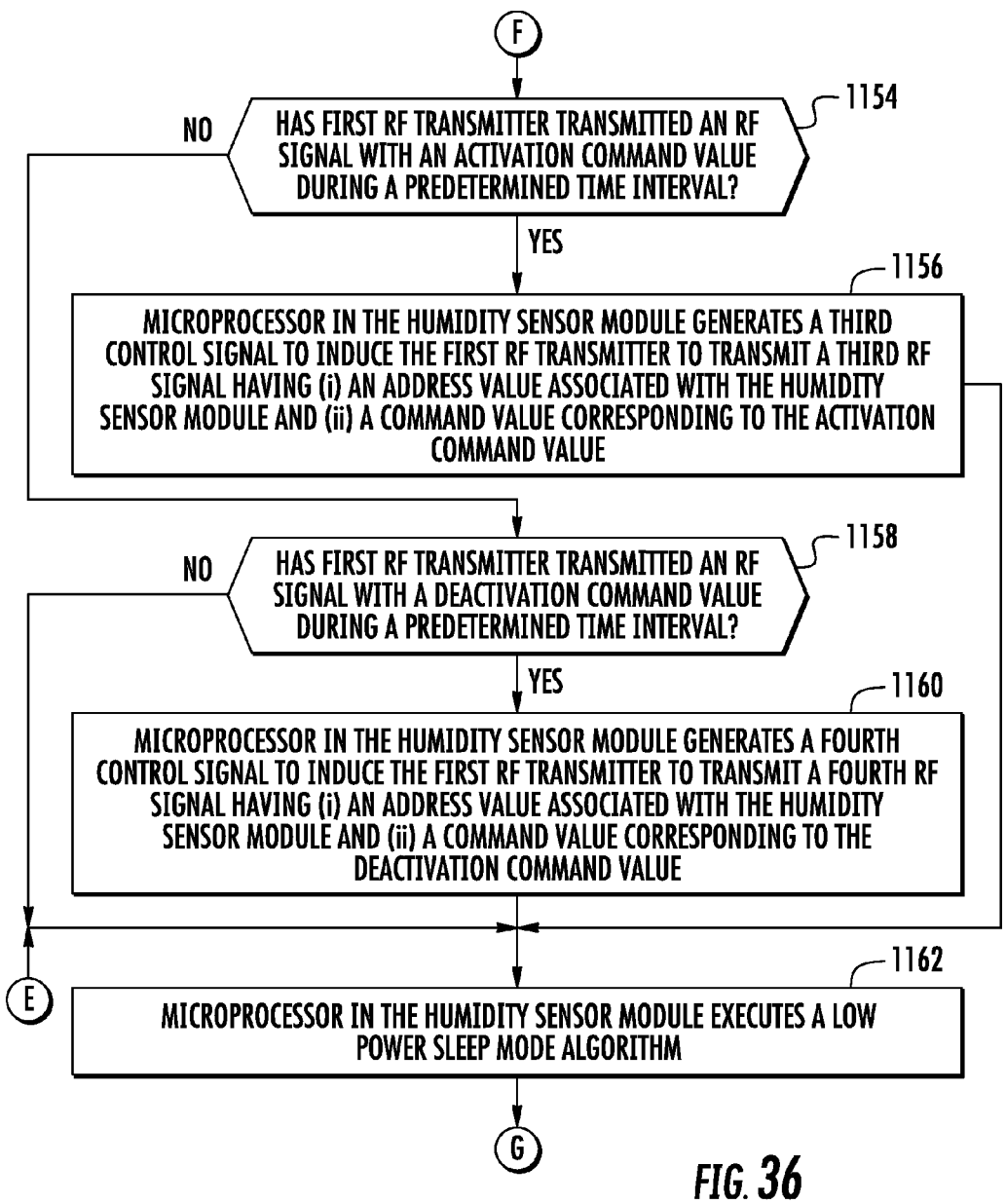

Referring to FIGS. 15 and 34, the low-power sleep mode algorithm of step 1092 will now be explained.

At step 1100, the microprocessor 484 resets a wake-up timer. After step 1100, the method advances to step 1102.

At step 1102, the microprocessor 484 enters a low power sleep mode. After step 1102, the method advances to step 1104.

At step 1104, the microprocessor 484 makes a determination as to whether the wake-up timer in shower water sensor module 334 has a timer count greater than a threshold timer count. If the value of step 1104 equals "yes", the method advances to step 1106. Otherwise, the method returns to step 1104.

At step 1106, the microprocessor 484 enters a wake-up mode. After step 1106, the method returns to step 1070 (shown in FIG. 32).

Humidity Sensor Module

Referring to FIGS. 10, 12, 17 and 18, the humidity sensor module 338 is provided to detect a humidity level in the bathroom 200 and to transmit an RF signal to the fan control module 346 to activate the electric motor 286 when a sensor signal indicative of the humidity level has an amplitude greater than or equal to a predetermined amplitude. The humidity sensor module 338 is further provided to transmit an RF signal to the fan control module 346 to deactivate the electric motor 286 when the sensor signal indicative of the humidity level has an amplitude less than the predetermined amplitude. The humidity sensor module 338 includes a housing 580, a microprocessor 584, a switch 588, a battery 592, an address switch assembly 596, an RF transmitter 600, an antenna 604, and a humidity sensor 608.

The microprocessor 584 is provided to control operation of the humidity sensor module 338. The microprocessor 584 is operably and electrically coupled to the battery 592, the RF transmitter 600, the humidity sensor 608, the switch 588, and the address switch assembly 596. The microprocessor 584 includes an internal memory 585 that is configured to store executable software instructions and data utilized by the humidity sensor module 338.

The battery 592 is electrically coupled to the microprocessor 584, the RF transmitter 600, and the humidity sensor 608. The battery 592 provides an operational voltage to the microprocessor 584, the RF transmitter 600, and the humidity sensor 608.

The switch 588 is electrically coupled to and between the microprocessor 584 and electrical ground. When the switch 588 is moved to a closed operational position, the microprocessor 584 generates a control signal to induce the RF transmitter 600 to transmit an RF signal having an activation command for turning on the electric motor 286 in the fan assembly 220. Alternately, when the switch 588 is moved to an open operational position, the microprocessor 584 generates a control signal to induce the RF transmitter 600 to transmit an RF signal having a deactivation command for turning off the electric motor 286 in the fan assembly 220. A portion of the switch 588 extends outwardly from an exterior of the housing 580 and can be actuated by a person holding the housing 580.

The address switch assembly 596 is electrically coupled to the microprocessor 584. The address switch assembly 596 includes address switches 610, 612, 614, 616, 618, 620, 622, 624 which define an 8-bit binary address value which identifies the humidity sensor module 338 to the fan control module 346. In an exemplary embodiment, the address value of "11111100" is associated with the humidity sensor module 338.

The RF transmitter 600 is operably coupled to the antenna 604. The RF transmitter 600 is provided to transmit RF signals to the fan control module 346 such that the fan control module 346 can either activate or deactivate the electric motor 286 in the fan assembly 220. The microprocessor 584 is programmed to generate a control signal to induce the RF transmitter 600 to transmit an RF signal having a binary address value and a binary command value. In an exemplary embodiment, the binary address value is 8-bit binary number determined by the address switches 610-624. Further, the binary command value is 8-bit binary number comprising either an activation command value (e.g., 000000011) or a deactivation command value (e.g., 000000001). The activation command value is utilized by the fan control module 346 for activating the electric motor 286. The deactivation command value is utilized by the fan control module 346 for deactivating the electric motor 286.

In an exemplary embodiment, the RF transmitter 600 transmits RF signals in a high frequency range (e.g., 3 Mhz-30 MHz). Of course, in an alternative embodiment, the RF transmitter 600 could transmit RF signals in another frequency range. In an exemplary embodiment, the RF transmitter 600 modulates each RF signal to include data (e.g., an address value and a command value) utilizing frequency shift keying (FSK) modulation technique. In an alternative embodiment, the RF transmitter 600 can modulate each RF signal to include data utilizing any other known modulation technique such as amplitude modulation (AM), frequency modulation (FM), and amplitude shift keying (ASK), or the like.

The humidity sensor 608 is electrically coupled to the microprocessor 584. The humidity sensor 608 is configured to generate a sensor signal having an amplitude based on a humidity level. The microprocessor 584 is programmed to measure the amplitude of the sensor signal from the humidity sensor 608. If the amplitude of the sensor signal is greater than or equal to a predetermined amplitude, the microprocessor 584 determines that the humidity level is greater than or equal to a predetermined humidity level. Alternately, if the amplitude of the sensor signal is less than a predetermined amplitude, the microprocessor 584 determines that the humidity level is less than the predetermined humidity level.

Referring to FIGS. 17, 18 and 35-37, a method for controlling operation of the humidity sensor module 338 will now be described.

At step 1140, the microprocessor 584 makes a determination as to whether the manually-operated switch 588 in the humidity sensor module 338 is depressed. If the value of step 1140 equals "yes", the method advances to step 1142. Otherwise, the method advances to step 1148.

At step 1142, the microprocessor 584 makes a determination as to whether the manually-operated switch 588 in the humidity sensor module 338 has a closed operational position. If the value of step 1142 equals "yes", the method advances to step 1144. Otherwise, the method advances to step 1146.

At step 1144, the microprocessor 584 generates a first control signal to induce a first RF transmitter 600 to transmit a first RF signal having (i) an address value associated with the humidity sensor module 338 and (ii) a command value corresponding to an activation command value. After step 1144, the method advances to step 1162.

Referring again to step 1142, if the value of step 1142 equals "no", the method advances to step 1146. At step 1146, the microprocessor 584 generates a second control signal to induce the first RF transmitter 600 to transmit a second RF signal having (i) the address value associated with the humidity sensor module 338 and (ii) a command value corresponding to a deactivation command value. After step 1146, the method advances to step 1162.

Referring again to step 1140, if the value of step 1140 equals "no", the method advances to step 1148. At step 1148, the microprocessor 584 makes a determination as to whether the humidity sensor 608 in the humidity sensor module 338 is generating a sensor signal. The sensor signal has an amplitude based on an amount of sensed humidity. If the value of step 1148 equals "yes", the method advances to step 1150. Otherwise, the method advances to step 1162.

At step 1150, the microprocessor 584 makes a determination as to whether an average amplitude of the sensor signal over a predetermined time interval is greater than a predetermined amplitude, indicating an excessive amount of humidity. If the value of step 1150 equals "yes", the method advances to step 1154. Otherwise, the method advances to step 1162.

At step 1154, the microprocessor 584 makes a determination as to whether the first RF transmitter 600 has transmitted an RF signal with an activation command value during a predetermined time interval. If the value of step 1154 equals "yes", the method advances to step 1156. Otherwise, the method advances to step 1158.

At step 1156, the microprocessor 584 generates a third control signal to induce the first RF transmitter 600 to transmit a third RF signal having (i) an address value associated with the humidity sensor module 338 and (ii) a command value corresponding to the activation command value. After step 1156, the method advances to step 1162.

Referring again to step 1154, if the value of step 1154 equals "no", the method advances to step 1158. At step 1158, the microprocessor makes a determination as to whether the first RF transmitter 600 has transmitted an RF signal with a deactivation command value during the predetermined time interval. If the value of step 1158 equals "yes", the method advances to step 1160. Otherwise, the method advances to step 1162.

At step 1160, the microprocessor 584 generates a fourth control signal to induce the first RF transmitter 600 to transmit a fourth RF signal having (i) an address value associated with the humidity sensor module 338 and (ii) a command value corresponding to the deactivation command value. After step 1160, the method advances to step 1162.

At step 1162, the microprocessor 584 executes a low power sleep mode algorithm. After step 1162, the method returns to step 1140.

Figure 17:
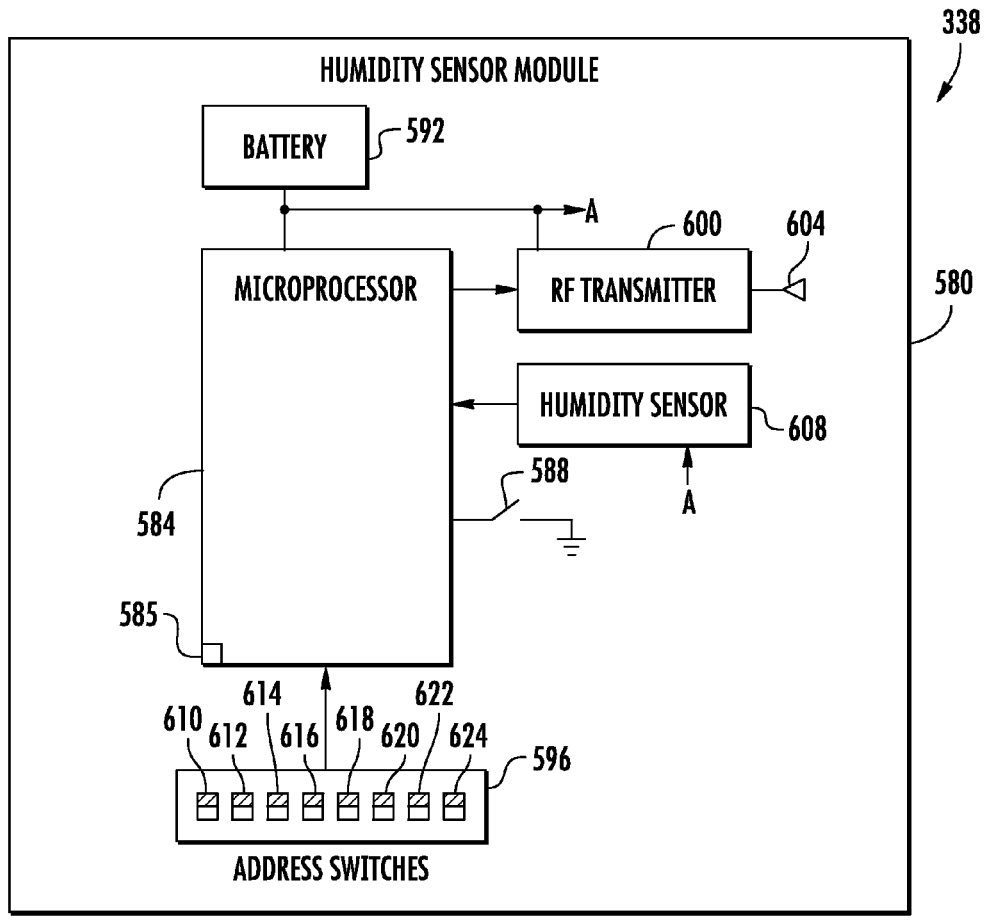
FIG. 17 is a block diagram of a humidity sensor module utilized in the remote control system of FIG. 12.
Figure 18:
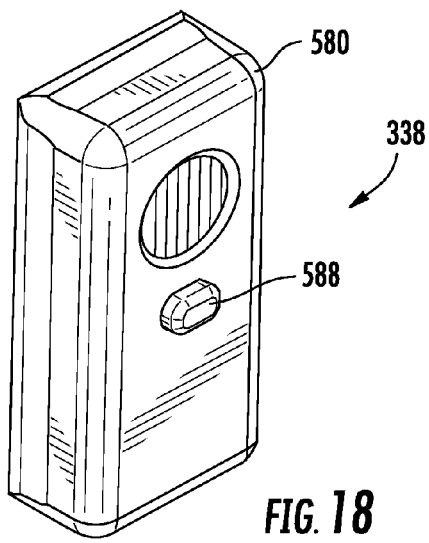
FIG. 18 is a schematic of the humidity sensor module of FIG. 17.
Figure 37:
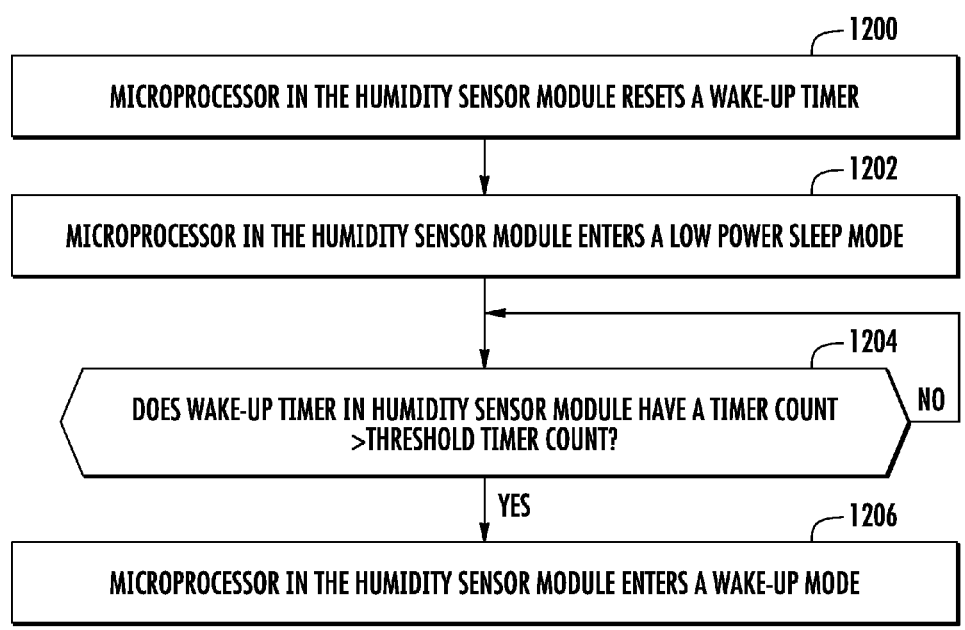
Figure 38:
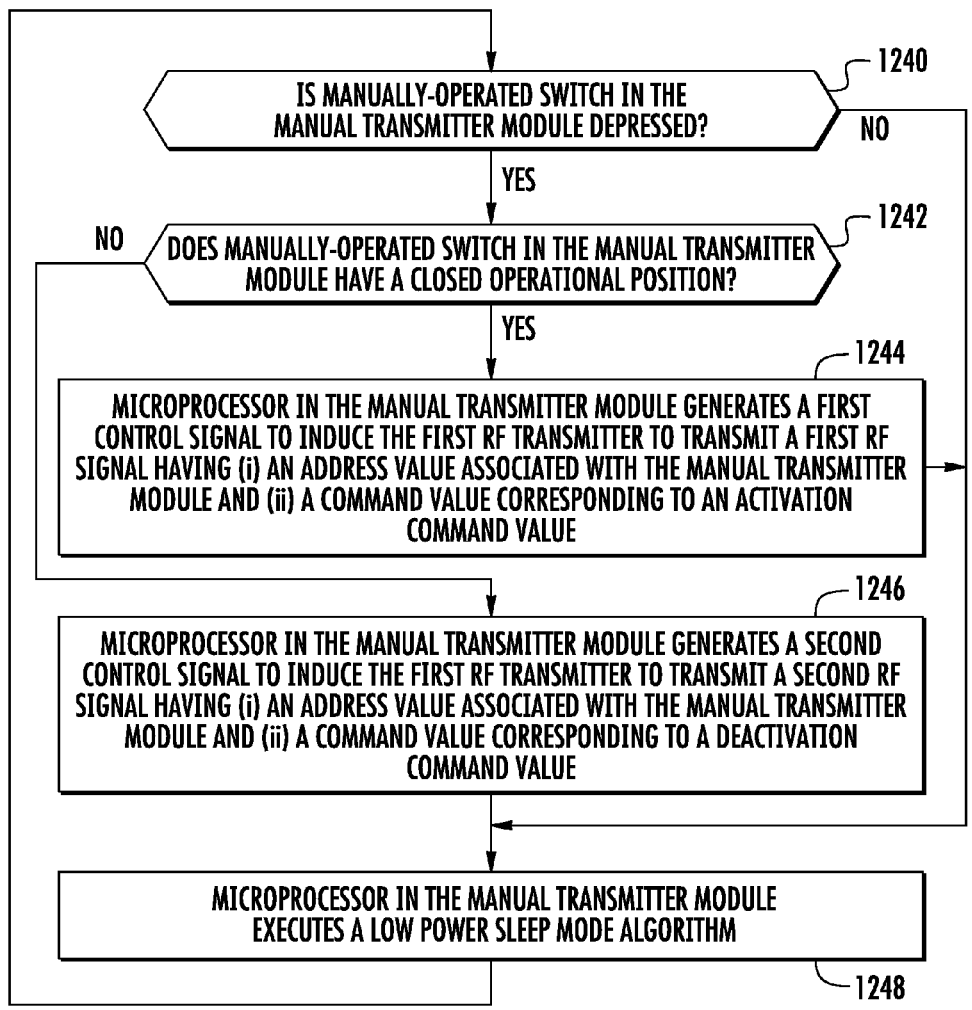
FIGS. 38-39 are flowcharts of a method for controlling operation of the manual transmitter module of FIG. 19.

Referring to FIGS. 17 and 37, the low-power sleep mode algorithm of step 1162 will now be explained.

At step 1200, the microprocessor 584 resets a wake-up timer. After step 1200, the method advances step 1202.

At step 1202, the microprocessor 584 enters a low power sleep mode. After step 1202, the method advances to step 1204.

At step 1204, the microprocessor 584 makes a determination as to whether the wake-up timer in humidity sensor module 338 has a timer count greater than a threshold timer count. If the value of step 1204 equals "yes", the method advances to step 1206. Otherwise, the method returns to step 1204.

At step 1206, the microprocessor 584 enters a wake-up mode. After step 1206, the method returns to step 1140.

Manual Transmitter Module

Referring to FIGS. 10, 12, 19 and 20, the manual transmitter module 342 is provided to transmit an RF signal to the fan control module 346 to activate the electric motor 286 when a manually-activated switch 688 has a closed operational position. The manual transmitter module 342 is further provided to transmit an RF signal to the fan control module 346 to deactivate the electric motor 286 when the manually-activated switch 688 has an open operational position. The manual transmitter module 342 includes a housing 680, a microprocessor 684, a switch 688, a battery 692, an address switch assembly 696, an RF transmitter 700, an antenna 704.

The microprocessor 684 is provided to control operation of the manual transmitter module 342. The microprocessor 684 is operably and electrically coupled to the battery 692, the RF transmitter 700, the switch 688, and the address switch assembly 696. The microprocessor 684 includes an internal memory 685 that is configured to store executable software instructions and data utilized by the manual transmitter module 342.

The battery 692 is electrically coupled to the microprocessor 684 and the RF transmitter 700. The battery 692 provides an operational voltage to the microprocessor 684 and the RF transmitter 700.

The switch 688 is electrically coupled to and between the microprocessor 684 and electrical ground. When the switch 688 is moved to a closed operational position, the microprocessor 684 generates a control signal to induce the RF transmitter 700 to transmit an RF signal having an activation command for turning on the electric motor 286 in the fan assembly 220. Alternately, when the switch 688 is moved to an open operational position, the microprocessor 684 generates a control signal to induce the RF transmitter 700 to transmit an RF signal having a deactivation command for turning off the electric motor 286 in the fan assembly 220. A portion of the switch 688 extends outwardly from an exterior of the housing 680 and can be actuated by a person holding the housing 680.

The address switch assembly 696 is electrically coupled to the microprocessor 684. The address switch assembly 696 includes address switches 710, 712, 714, 716, 718, 720, 722, 724 which define an 8-bit binary address value which identifies the manual transmitter module 342 to the fan control module 346. In an exemplary embodiment, the address value of "11111000" is associated with the manual transmitter module 342.

The RF transmitter 700 is operably coupled to the antenna 704. The RF transmitter 700 is provided to transmit RF signals to the fan control module 346 such that the fan control module 346 can either activate or deactivate the electric motor 286 in the fan assembly 220. The microprocessor 684 is programmed to generate a control signal to induce the RF transmitter 700 to transmit an RF signal having a binary address value and a binary command value. In an exemplary embodiment, the binary address value is 8-bit binary number determined by the address switches 710-724. Further, the binary command value is 8-bit binary number comprising either an activation command value (e.g., 000000011) or a deactivation command value (e.g., 000000001). The activation command value is utilized by the fan control module 346 for activating the electric motor 286. The deactivation command value is utilized by the fan control module 346 for deactivating the electric motor 286.

In an exemplary embodiment, the RF transmitter 700 transmits RF signals in a high frequency range (e.g., 3 Mhz-30 MHz). Of course, in an alternative embodiment, the RF transmitter 700 could transmit RF signals in another frequency range. In an exemplary embodiment, the RF transmitter 700 modulates each RF signal to include data (e.g., an address value and a command value) utilizing frequency shift keying (FSK) modulation technique. In an alternative embodiment, the RF transmitter 700 can modulate each RF signal to include data utilizing any other known modulation technique such as amplitude modulation (AM), frequency modulation (FM), and amplitude shift keying (ASK), or the like.

Referring to FIGS. 19, 20 and 38-39, a method for controlling operation of the manual transmitter module 342 will now be described.

At step 1240, the microprocessor 684 makes a determination as to whether the manually-operated switch in the manual transmitter module is depressed. If the value of step 1240 equals "yes", the method advances to step 1242. Otherwise, the method advances to step 1248.

At step 1242, the microprocessor 684 makes a determination as to whether the manually-operated switch 688 in the manual transmitter module 342 has a closed operational position. If the value of step 1242 equals "yes", the method advances to step 1244. Otherwise, the method advances to step 1246.

At step 1244, the microprocessor 684 generates a first control signal to induce the first RF transmitter 700 to transmit a first RF signal having (i) an address value associated with the manual transmitter module 342 and (ii) a command value corresponding to an activation command value. After step 1244, the method advances to step 1248.

Referring again to step 1242, if the value of step 1242 equals "no", the method advances to step 1246. At step 1246, the microprocessor 684 generates a second control signal to induce the first RF transmitter 700 to transmit a second RF signal having (i) the address value associated with the manual transmitter module 342 and (ii) a command value corresponding to a deactivation command value. After step 1246, the method advances to step 1248.

At step 1248, the microprocessor 684 executes a low power sleep mode algorithm. After step 1248, the method returns to step 1240.

Figure 19:
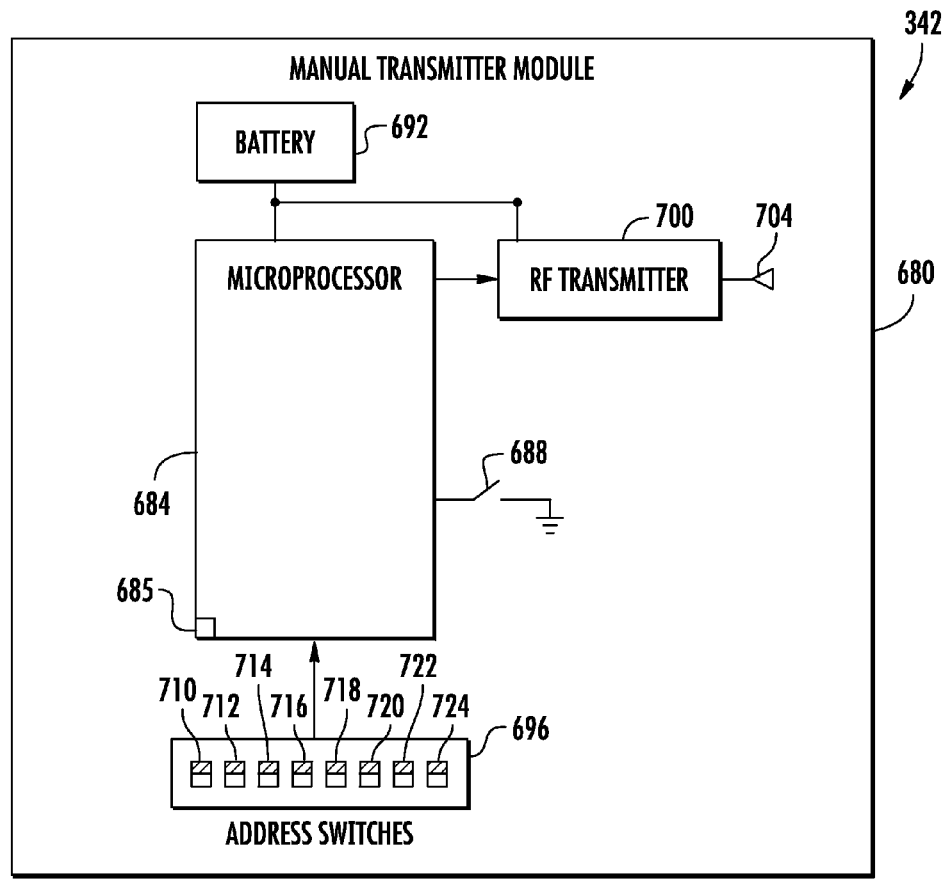
FIG. 19 is a block diagram of a manual transmitter module utilized in the remote control system of FIG. 12.
Figure 20:
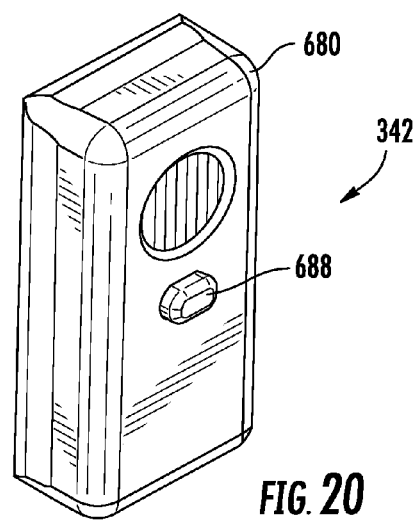
FIG. 20 is a schematic of the manual transmitter module of FIG. 19.
Figure 39:
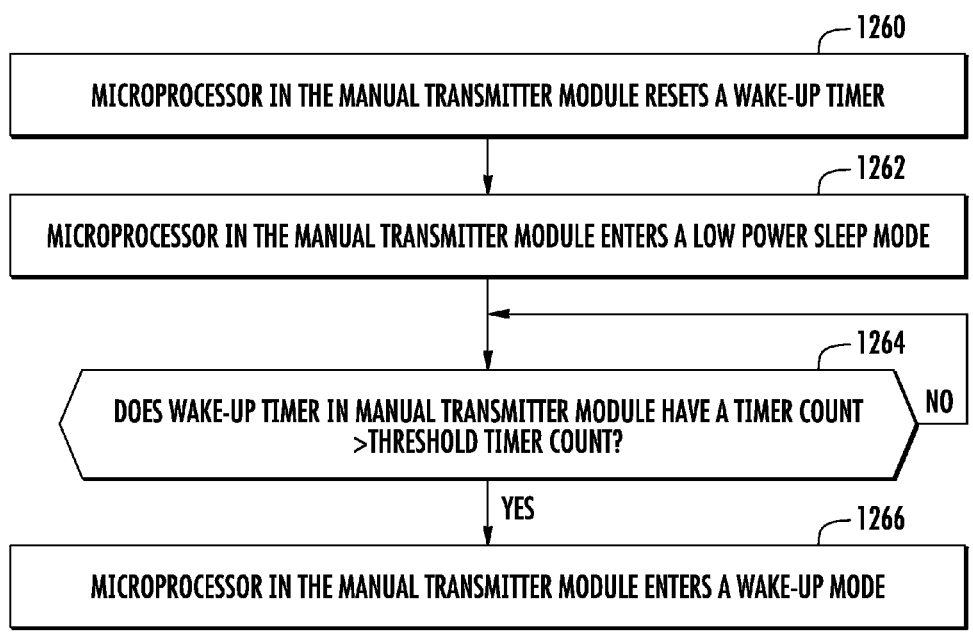

Referring to FIGS. 19 and 39, the low-power sleep mode algorithm of step 1248 will now be explained.

At step 1260, the microprocessor 684 resets a wake-up timer. After step 1260, the advances to step 1262.

At 1262, the microprocessor 684 enters a low power sleep mode. After step 1262, the method advances to step 1264.

At step 1264, the microprocessor 684 makes a determination as to whether the wake-up timer in manual transmitter module 342 has a timer count greater than the threshold timer count. If the value of step 1264 equals "yes", the method advances to step 1266. Otherwise, the method returns to step 1264.

At step 1266, the microprocessor 684 enters a wake-up mode. After step 1266, the method returns to step 1240.

Fan Control Module

Referring to FIGS. 21-25, the fan control module 346 is provided to electrically activate the electric motor 286 in the fan assembly 220, and to electrically deactivate the electric motor 286. The fan control module 346 includes a housing 780, a microprocessor 784, an AC power plug 788, an AC/DC converter 792, a controllable switch 796, a switch 797, an AC outlet 798, an RF receiver 800, and an antenna 804.

The housing 780 is configured to hold the microprocessor 784, the AC/DC voltage converter 792, the controllable switch 796, and the RF receiver 800 within the housing 780.

The AC power plug 788 is coupled to the housing 780 and includes blades 822, 823 extending outwardly from the housing 780. The AC power plug 788 is removably electrically coupled to the AC socket 298 (shown in FIG. 26) of the fan assembly 220 which receives an AC voltage when the electrical switch 216 (shown in FIG. 10) has a closed operational position. The AC power plug 788 is further electrically coupled to the AC/DC voltage converter 792 and to the controllable switch 796 such that an AC voltage is routed from the AC power plug 788 to the AC/DC voltage converter 792 and to the controllable switch 796. In an exemplary embodiment, the controllable switch 796 is a Triac device or a transistor.

The AC/DC voltage converter 792 is electrically coupled to the microprocessor 784 and to the RF receiver 800. The AC/DC voltage converter 792 is configured to output a DC voltage in response to the AC voltage from the AC power plug 788. The DC voltage is received by the microprocessor 784 and the RF receiver 800, which is used to power the microprocessor 784 and the RF receiver 800.

The AC socket 798 includes AC socket receptacles 834, 835 (shown in FIG. 22) communicating with electrical connectors 836, 837, respectively. The electrical connectors 836, 837 are configured to be removably and electrically coupled to the blades 312, 314, respectively, of the AC power plug 290 of the fan assembly 220. The electrical connector 836 is further electrically coupled to a first end of the controllable switch 796. A second end of the controllable switch 796 is electrically coupled to the blade 823 of the AC power plug 788 which is further electrically coupled to an AC voltage source. The electrical connector 837 is further electrically coupled to the blade 822 of the AC power plug 788 which is further electrically coupled to an AC voltage source.

The microprocessor 784 is provided to control operation of the fan assembly 220. The microprocessor 784 is operably and electrically coupled to the RF receiver 800, the AC/DC converter 792, and the controllable switch 796. The microprocessor 784 includes an internal memory 785 configured to store executable software instructions and data utilized by the fan control module 346. The internal memory 785 stores address values associated with the toilet occupancy sensor module 330, the shower water sensor module 334, the humidity sensor module 338, and the manual transmitter module 342 therein.

The switch 797 is electrically coupled to the microprocessor 784. In an exemplary embodiment, when the switch 797 is moved to a closed operational position, the microprocessor 784 enters a learning mode of operation to learn address values associated with the toilet occupancy sensor module 330, the shower water sensor module 334, the humidity sensor module 338, and the manual transmitter module 342. In particular, when the switch 797 is moved to a closed operational position, the microprocessor 784 enters the learning mode of operation and when the RF receiver 800 receives RF signals from the modules 330, 334, 338, 342, the microprocessor 784 stores the associated address values from the RF signals in the memory 785. After a predetermined amount of time, the microprocessor 784 exits the learning mode of operation. Thereafter, the microprocessor 784 can perform tasks in response to RF signals from the modules 330, 334, 338, 342 having address values that match the stored address values.

The RF receiver 800 is operably coupled to the antenna 804. The RF receiver 800 is provided to receive RF signals from the toilet occupancy sensor module 330, the shower water sensor module 334, the humidity sensor module 338, and the manual transmitter module 342.

In an exemplary embodiment, the RF receiver 800 receives RF signals in a high frequency range (e.g., 3 Mhz-30 MHz). Of course, in an alternative embodiment, the RF receiver 800 could receive RF signals in another frequency range. In an exemplary embodiment, the RF receiver 800 receives RF signals that are modulated to include data (e.g., an address value and a command value). The modulated RF signals can be modulated utilizing a frequency shift keying (FSK) modulation technique. In an alternative embodiment, the RF receiver 800 can receive modulated RF signals containing data (e.g., an address value and a command value) that were modulated utilizing any other known modulation technique such as amplitude modulation (AM), frequency modulation (FM), and amplitude shift keying (ASK), or the like.

The microprocessor 784 is programmed to extract the address value and the command value from each received RF signal. In an exemplary embodiment, each address value is an 8-bit binary number, and the command value is an 8-bit binary number corresponding to either an activation command value (e.g., 000000011) or a deactivation command value (e.g., 000000001). The activation command value is utilized by the fan control module 346 for activating the electric motor 286. The deactivation command value is utilized by the fan control module 346 for deactivating the electric motor 286.

During operation, when the controllable switch 796 has a closed operational position, an AC voltage is applied to the AC socket 798. Further, the AC voltage is supplied through two conductors in the AC electrical wire 294 to the fan motor 286 for activating the fan motor 286. When the fan motor 286 is activated, the motor 286 turns the fan blades 282 to exhaust air from the interior of the bathroom 200. Alternately, when the controllable switch 796 has an open operational position, an AC voltage is not applied to the AC socket 798. Further, the AC voltage is not supplied through two conductors in the AC electrical wire 294 to the fan motor 286 and the fan motor 286 is the activated. When the fan motor 286 is the activated, the motor 286 stops turning the fan blades 282 to stop exhausting air from the interior of the bathroom 200.

Figure 21:
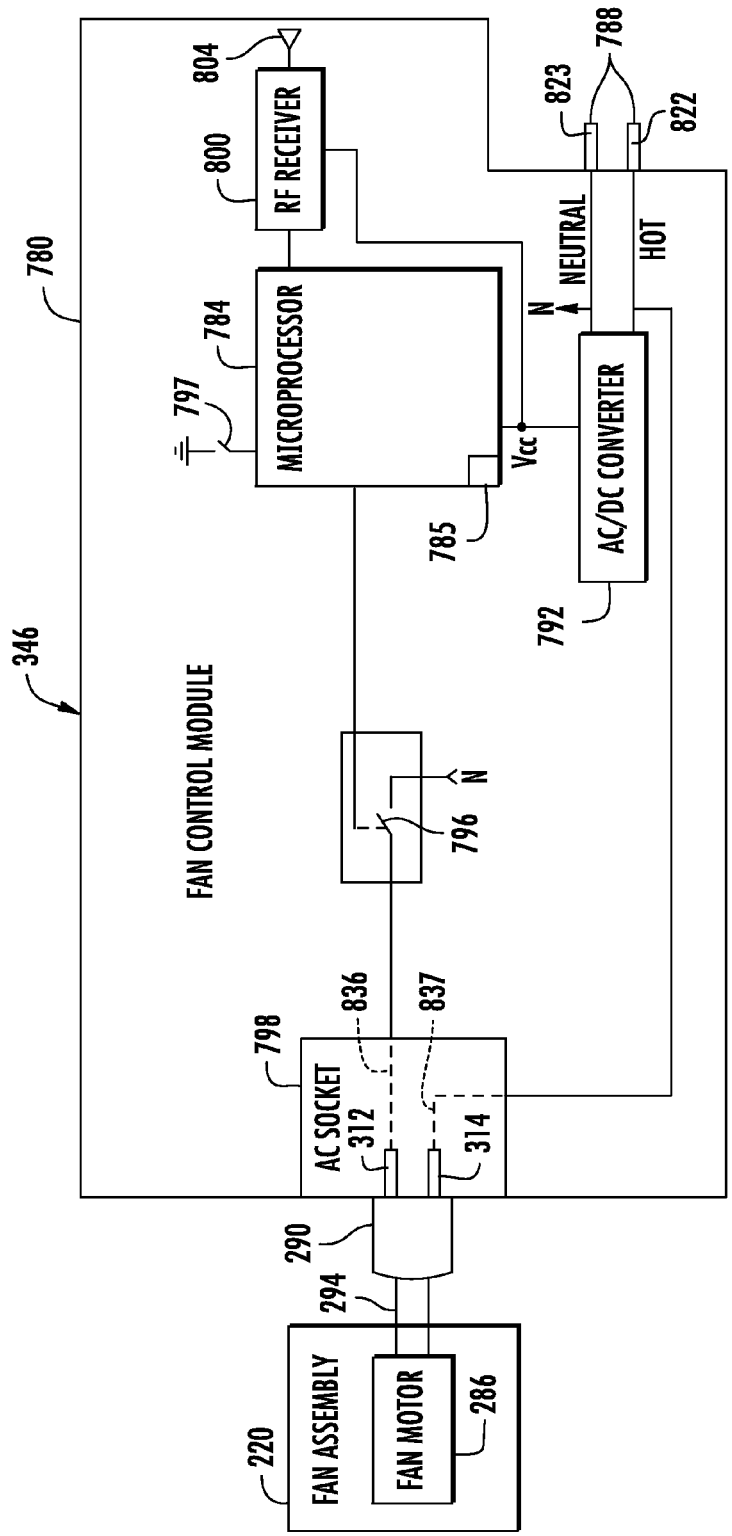
FIG. 21 is a circuit schematic of a fan control module utilized in the remote control system of FIG. 12.
Figure 22:
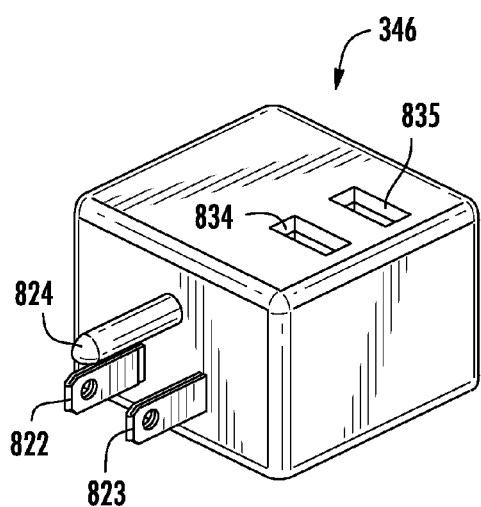
FIG. 22 is a schematic of the fan control module of FIG. 21.
Figure 23:
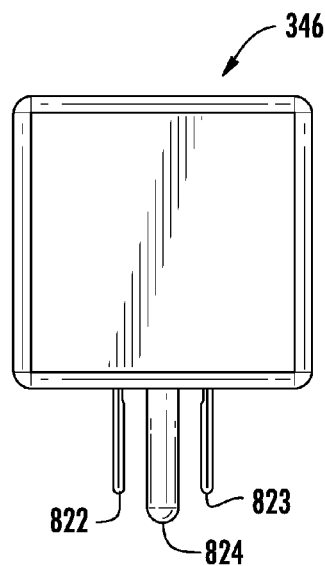
FIG. 23 is another schematic of the fan control module of FIG. 21.
Figure 24:
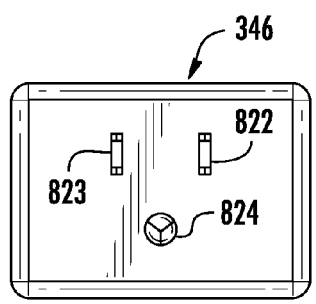
FIG. 24 is another schematic of the fan control module of FIG. 21.
Figure 25:
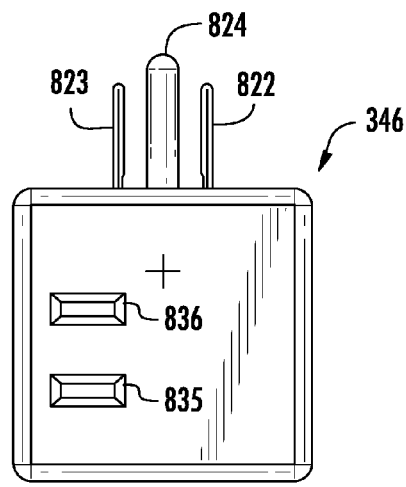
FIG. 25 is another schematic of the fan control module of FIG. 21.
Figure 40:
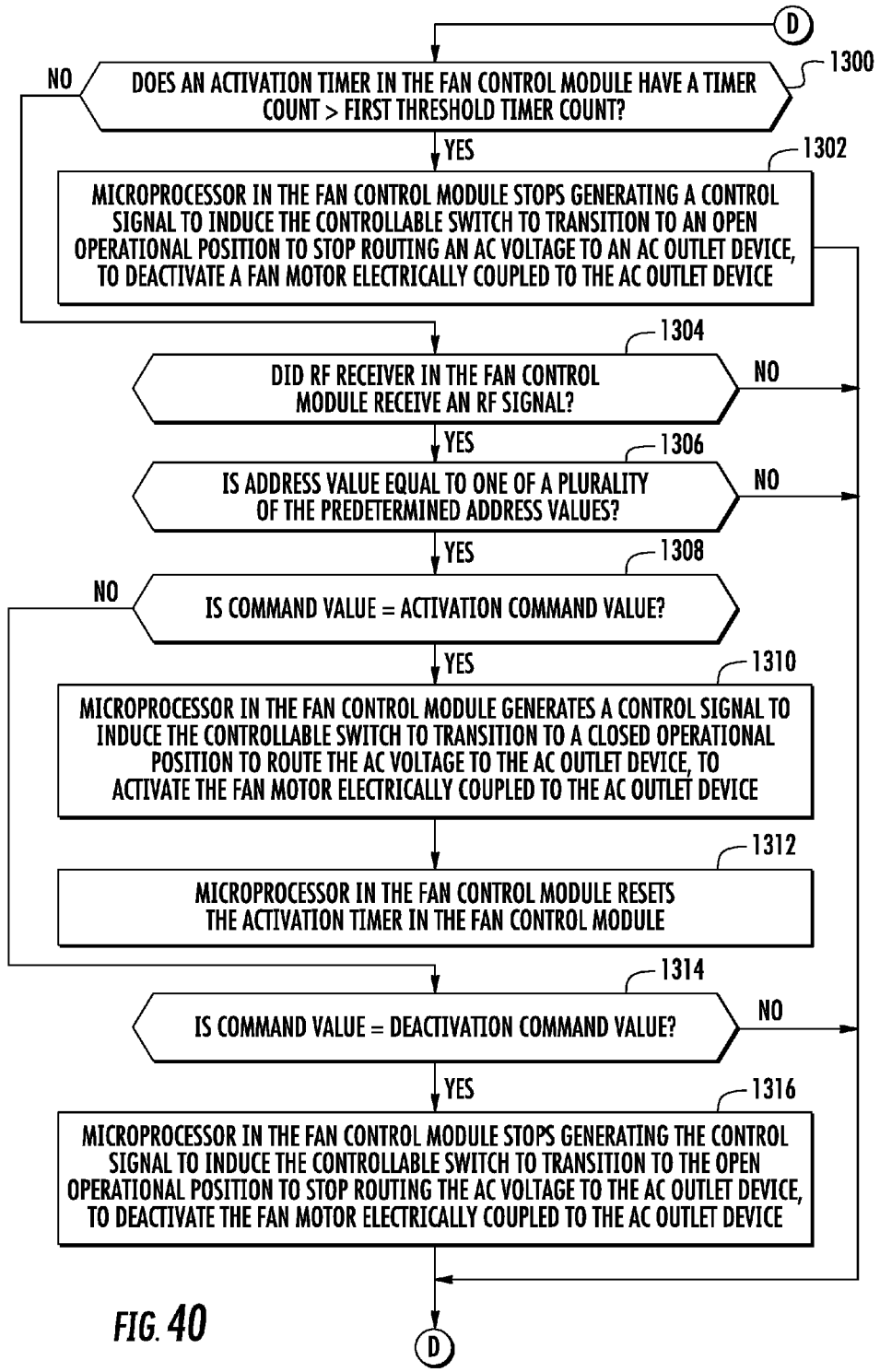
FIG. 40 is a flowchart of a method for controlling operation of the fan control module of FIG. 21.

Referring to FIGS. 21, 26, and 40, a method for controlling operation of the fan control module 346 and the fan assembly 220 will now be described.

At step 1300, the microprocessor 784 makes a determination as to whether an activation timer in the fan control module 346 has a timer count greater than a first threshold timer count. If the value step 1300 equals "yes", the method advances to step 1302. Otherwise, the method advances to step 1304.

At step 1302, the microprocessor 784 stops generating a control signal to induce the controllable switch 796 to transition to an open operational position to stop routing an AC voltage to an AC outlet device 798, to deactivate a fan motor 286 electrically coupled to the AC outlet device 798. After step 1302, the method advances to step 1318.

Referring again to step 1300, if the value step 1300 equals "no", the method advances to step 1304. At step 1304, the microprocessor 784 makes a determination as to whether the RF receiver 800 in the fan control module 346 received an RF signal. If the value of step 1304 equals "yes", the method advances to step 1306. Otherwise, the method advances to step 1318.

At step 1306, the microprocessor 784 makes a determination as to whether the address value is equal to one of a plurality of the predetermined address values. In an exemplary embodiment, the predetermined address values are: "11111111" for the toilet occupancy sensor module 330, "11111110" for the shower water sensor module 334, "11111100" for the humidity sensor module 338, and "11111000" for the manual transmitter module 342 which are stored in the memory device 785. If the value of step 1306 equals "yes", the method advances to step 1308. Otherwise, the method advances to step 1318.

At step 1308, the microprocessor 784 makes a determination as to whether the command value is equal to an activation command value. If the value of step 1308 equals "yes", the method advances to step 1310. Otherwise, the method advances to step 1314.

At step 1310, the microprocessor 784 generates a control signal to induce the controllable switch 796 to transition to a closed operational position to route the AC voltage to the AC outlet device 798, to activate the fan motor 286 electrically coupled to the AC outlet device 798. After step 1310, the method advances to step 1312.

At step 1312, the microprocessor 784 resets the activation timer in the fan control module 346. After step 1312, the method advances to step 1318.

Referring again to step 1308, if the value step 1308 equals "no", the method advances to step 1314. At step 1314, the microprocessor 784 makes a determination as to whether the command value is equal to a deactivation command value. If the value step 1314 equals "yes", the method advances to step 1316. Otherwise, the method advances to step 1318.

At step 1316, the microprocessor 784 stops generating the control signal to induce the controllable switch 796 to transition to the open operational position to stop routing the AC voltage to the AC outlet device 798, to deactivate the fan motor 286 electrically coupled to the AC outlet device 798. After step 1316, the method returns to step 1300.

The remote control system for controlling operation of the fan assembly provides a substantial advantage over other systems. In particular, the remote control system provides a technical effect of utilizing at least one of a toilet occupancy sensor module, a shower water sensor module, a humidity sensor module, and a manual transmitter module, to transmit wireless RF signals to a fan control module for remotely activating and deactivating an electric motor in a fan assembly.

In an exemplary embodiment, each of the following modules utilize a microprocessor therein: the toilet occupancy sensor module 330, the shower water sensor module 334, the humidity sensor module 338, the manual transmitter module 342, and the fan control module 346. In an alternative embodiment, another type of controller could be utilized in each of the foregoing modules to implement the steps performed by each respective microprocessor described above.

The above-described methods can be at least partially embodied in the form of one or more computer readable media having computer-executable instructions for practicing the methods. The computer-readable media can comprise one or more of the following: hard drives, flash memory, and other computer-readable media known to those skilled in the art; wherein, when the computer-executable instructions are loaded into and executed by one or more microprocessors, the one or more microprocessors are programmed to implement at least portions of the methods.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A remote control system for controlling operation of a fan assembly, comprising:
    a first sensor module having a first housing, a first sensor, a first microprocessor, a first RF transmitter; the first sensor, the first microprocessor and the first RF transmitter being disposed within the first housing, the first microprocessor being operably coupled to the first sensor and the first RF transmitter;
    the first microprocessor being programmed to generate a first control signal to induce the first RF transmitter to transmit a first RF signal in response to a sensor signal from the first sensor, the first RF signal having a first address value and a first command value;
    a fan control module having a second housing, a second microprocessor, a first AC power plug, an AC socket, an AC/DC voltage converter, a controllable switch, an RF receiver; the second microprocessor, the AC/DC voltage converter, the controllable switch, and the RF receiver being disposed within the second housing; the second housing being sized and shaped such that the second housing is at least partially disposed within the fan assembly, the first AC power plug being coupled directly to the second housing and having first and second blades that extend outwardly from the second housing; the second microprocessor being operably coupled to the AC/DC voltage converter, the controllable switch, and the RF receiver;
    the first and second blades of the first AC power plug being electrically coupled to the AC/DC voltage converter, the first blade of the first AC power plug being electrically coupled to a first side of the controllable switch, and an AC voltage is routed from the first AC power plug to the AC/DC voltage converter and the controllable switch;
    the AC socket having first and second AC socket receptacles communicating with first and second electrical connectors, respectively, within the AC socket; the first electrical connector being electrically coupled to a second side of the controllable switch; the second electrical connector being electrically coupled to the second blade of the first AC power plug;
    the AC/DC voltage converter configured to output a DC voltage in response to the AC voltage, the DC voltage being received by the second microprocessor and the RF receiver;
    the RF receiver configured to receive the first RF signal;
    the second microprocessor being programmed to compare the first address value to a first predetermined address value; and
    the second microprocessor being further programmed to generate a second control signal to induce the controllable switch to transition to a closed operational position to route the AC voltage to the AC socket if the first address value corresponds to the first predetermined address value, and the first command value corresponds to an activation command value; the AC socket configured to be electrically removably coupled to first and second blades of a second AC power plug of the fan assembly.

2. The remote control system of claim 1, wherein a fan motor in the fan assembly is activated in response to receiving the AC voltage from the AC socket.

3. The remote control system of claim 1, wherein the first and second AC socket receptacles of the AC socket being configured to receive the first and second blades, respectively, of the second AC power plug therein of the fan assembly.

4. The remote control system of claim 1, wherein:
    the first sensor module is a toilet occupancy sensor module and the first sensor is an infrared sensor, the infrared sensor being configured to generate the sensor signal having an amplitude based on an amount of sensed human body heat energy; and
    the first microprocessor being programmed to generate the first control signal to induce the first RF transmitter to transmit the first RF signal having the first command value corresponding to the activation command value, if the amplitude of the sensor signal is greater than a predetermined amplitude.

5. The remote control system of claim 1, wherein:
    the first sensor module is a shower water sensor module and the first sensor is an infrared sensor, the infrared sensor being configured to generate the sensor signal having an amplitude based on an amount of sensed water heat energy; and
    the first microprocessor being programmed to generate the first control signal to induce the first RF transmitter to transmit the first RF signal having the first command value corresponding to the activation command value, if the amplitude of the sensor signal is greater than a predetermined amplitude.

6. The remote control system of claim 1, wherein:
    the first sensor module is a humidity sensor module and the first sensor is a humidity sensor, the humidity sensor being configured to generate the sensor signal having an amplitude based on an amount of sensed humidity; and the first microprocessor being programmed to generate the first control signal to induce the first RF transmitter to transmit the first RF signal having the first command value corresponding to the activation command value, if the amplitude of the sensor signal is greater than a predetermined amplitude.

7. The remote control system of claim 1, wherein:

the first microprocessor of the first sensor module being further programmed to generate a third control signal to induce the first RF transmitter to transmit a second RF signal in response to the sensor signal from the first sensor, the second RF signal having a second address value and a second command value;

the RF receiver of the fan control module further configured to receive the second RF signal;

the second microprocessor being programmed to compare the second address value to the first predetermined address value; and the second microprocessor being further programmed to stop generating the second control signal to induce the controllable switch to transition to an open operational position to stop routing the AC voltage to the AC socket, if the second address value corresponds to the first predetermined address value, and the second command value corresponds to a deactivation command value.

8. The remote control system of claim 7, wherein the fan motor in the fan assembly is deactivated in response to not receiving the AC voltage from the AC socket.

9. The remote control system of claim 7, wherein:

the first sensor module is a toilet occupancy sensor module and the first sensor is an infrared sensor, the infrared sensor being configured to generate the sensor signal having an amplitude based on an amount of sensed human body heat energy; and the first microprocessor being programmed to generate the third control signal to induce the first RF transmitter to transmit the second RF signal having the second command value corresponding to the deactivation command value, if the amplitude of the sensor signal is less than a predetermined amplitude.

10. The remote control system of claim 7, wherein:

the first sensor module is a shower water sensor module and the first sensor is an infrared sensor, the infrared sensor being configured to generate the sensor signal having an amplitude based on an amount of sensed water heat energy; and the first microprocessor being programmed to generate the third control signal to induce the first RF transmitter to transmit the second RF signal having the second command value corresponding to the deactivation command value, if the amplitude of the sensor signal is less than a predetermined amplitude.

11. The remote control system of claim 7, wherein:

the first sensor module is a humidity sensor module and the first sensor is a humidity sensor, the humidity sensor being configured to generate the sensor signal having an amplitude based on an amount of sensed humidity; and the first microprocessor being programmed to generate the third control signal to induce the first RF transmitter to transmit the second RF signal having the second command value corresponding to the deactivation command value, if the amplitude of the sensor signal is less than a predetermined amplitude.

12. The remote control system of claim 1, wherein the second microprocessor being further programmed to stop generating the second control signal to induce the controllable switch to transition to an open operational position to stop routing the AC voltage to the AC socket, if the RF receiver does not receive an RF signal having the first address value and the first command value within a predetermined time after receiving the first RF signal.

13. The remote control system of claim 1, wherein the first sensor module further comprises a manually-operated switch operably coupled to the first microprocessor;

the first microprocessor being further programmed to detect when the manually-operated switch transitions to a closed operational position;

the first microprocessor being further programmed to generate a third control signal to induce the first RF transmitter to transmit a second RF signal in response to the manually-operated switch having the closed operational position; the second RF signal having a second address value and a second command value;

the RF receiver of the fan control module configured to receive the second RF signal;

the second microprocessor being further programmed to compare the second address value in the second RF signal to the first predetermined address value; and the second microprocessor being further programmed to generate a fourth control signal to induce the controllable switch to transition to the closed operational position to route the AC voltage to the AC socket, if the second address value corresponds to the first predetermined address value, and the second command value corresponds to the activation command value.

14. The remote control system of claim 13, wherein;

the first microprocessor being further programmed to detect when the manually-operated switch transitions to an open operational position;

the first microprocessor being further programmed to induce the first RF transmitter to transmit a third RF signal in response to the manually-operated switch having the open operational position; the third RF signal having a third address value and a third command value;

the RF receiver of the fan control module configured to receive the third RF signal;

the second microprocessor being further programmed to compare the third address value in the third RF signal to the first predetermined address value; and the second microprocessor being further programmed to stop generating the fourth control signal to induce the controllable switch to transition to an open operational position to stop routing the AC voltage to the AC socket, if the third address value corresponds to the first predetermined address value, and the third command value corresponds to the deactivation command value.

15. The remote control system of claim 1, further comprising:

a manual transmitter module having a third housing, a third microprocessor, a manually-operated switch, and a second RF transmitter; the third microprocessor and the second RF transmitter being disposed within the third housing, the third microprocessor being operably coupled to the second RF transmitter and the manually-operated switch;

the third microprocessor being programmed to detect when the manually-operated switch transitions to a closed operational position;

the third microprocessor being further programmed to generate a third control signal to induce the second RF transmitter to transmit a second RF signal in response to the manually-operated switch having the closed operational position; the second RF signal having a second address value and a second command value;

the RF receiver of the fan control module configured to receive the second RF signal;

the second microprocessor further programmed to compare the second address value in the second RF signal to a second predetermined address value; and the second microprocessor being further programmed to generate a fourth control signal to induce the controllable switch to transition to the closed operational position to route the AC voltage to the AC socket, if the second address value corresponds to the second predetermined address value, and the second command value corresponds to the activation command value.

16. The remote control system of claim 15, further comprising:

the third microprocessor being further programmed to detect when the manually-operated switch transitions to an open operational position;

the third microprocessor being further programmed to induce the first RF transmitter to transmit a third RF signal in response to the manually-operated switch having the open operational position; the third RF signal having a third address value and a third command value;

the RF receiver of the fan control module configured to receive the third RF signal;

the second microprocessor being further programmed to compare the third address value in the third RF signal to the second predetermined address value; and the second microprocessor being further programmed to stop generating the fourth control signal to induce the controllable switch to transition to an open operational position to stop routing the AC voltage to the AC socket, if the third address value corresponds to the second predetermined address value and the third command value corresponds to a deactivation command value.

17. A remote control system for controlling operation of a fan motor in a ceiling fan assembly, comprising:

a first sensor module having a first housing, a first sensor, a first microprocessor, and a first RF transmitter; the first sensor, the first microprocessor and the first RF transmitter being disposed within the first housing, the first microprocessor being operably coupled to the first sensor and the first RF transmitter;

the first microprocessor being programmed to generate a first control signal to induce the first RF transmitter to transmit a first RF signal in response to a sensor signal from the first sensor, the first RF signal having a first address value and a first command value;

a fan control module being disposed in a housing of the ceiling fan assembly, the fan control module having a second housing, a second microprocessor, a first AC power plug, an AC socket, an AC/DC voltage converter, a controllable switch, and an RF receiver; the second microprocessor, the AC/DC voltage converter, the controllable switch, and the RF receiver being disposed in the second housing; the second microprocessor being operably coupled to the AC/DC voltage converter, the controllable switch, and the RF receiver; the first AC power plug being coupled directly to the second housing and having first and second blades that extend outwardly from the second housing;

the AC/DC voltage converter and the controllable switch configured to receive an AC voltage;

the AC/DC voltage converter configured to output a DC voltage in response to the AC voltage, the DC voltage being received by the second microprocessor and the RF receiver;

the RF receiver configured to receive the first RF signal;

the second microprocessor being programmed to compare the first address value to a first predetermined address value; and the second microprocessor being further programmed to generate a second control signal to induce the controllable switch to transition to a closed operational position to route the AC voltage to the AC socket which is electrically coupled to the fan motor of the ceiling fan assembly if the first address value corresponds to the first predetermined address value, and the first command value corresponds to an activation command value; and the first microprocessor of the first sensor module being further programmed to generate a third control signal to induce the first RF transmitter to transmit a second RF signal in response to the sensor signal from the first sensor, the second RF signal having a second address value and a second command value;

the RF receiver of the fan control module further configured to receive the second RF signal;

the second microprocessor being programmed to compare the second address value to the first predetermined address value; and the second microprocessor being further programmed to stop generating the second control signal to induce the controllable switch to transition to an open operational position to stop routing the AC voltage to the AC socket, if the second address value corresponds to the first predetermined address value, and the second command value corresponds to a deactivation command value.

* * * * *